United States Patent
Beaumont et al.

(10) Patent No.: US 9,718,624 B2
(45) Date of Patent: Aug. 1, 2017

(54) SYSTEM AND METHOD FOR TRANSPORTING SAND

(71) Applicant: Sandmiser Inc., Mitchell (CA)

(72) Inventors: James Beaumont, Mitchell (CA); John M. Moses, Mitchell (CA)

(73) Assignee: Sandmiser Inc., Mitchell, Ontario (CA)

( * ) Notice: Subject to any disclaimer, the term of this patent is extended or adjusted under 35 U.S.C. 154(b) by 0 days.

(21) Appl. No.: 15/303,783

(22) PCT Filed: Apr. 17, 2015

(86) PCT No.: PCT/CA2015/000259
§ 371 (c)(1),
(2) Date: Oct. 13, 2016

(87) PCT Pub. No.: WO2015/157854
PCT Pub. Date: Oct. 22, 2015

(65) Prior Publication Data
US 2017/0029220 A1     Feb. 2, 2017

Related U.S. Application Data

(60) Provisional application No. 61/980,822, filed on Apr. 17, 2014.

(51) Int. Cl.
*A01K 1/00* (2006.01)
*B65G 19/00* (2006.01)
(Continued)

(52) U.S. Cl.
CPC .............. *B65G 45/12* (2013.01); *A01K 1/015* (2013.01); *B65G 17/40* (2013.01); *B65G 23/06* (2013.01);
(Continued)

(58) Field of Classification Search
CPC ........ A01K 1/014; A01K 1/035; B65G 19/00; B65G 19/04; B65G 23/24; B65G 47/74
(Continued)

(56) References Cited

U.S. PATENT DOCUMENTS 1,177,695 A * 4/1916 Gable .................. A01K 1/0135
119/451
1,735,585 A * 11/1929 Rivinius .............. A01K 1/0135
198/607
(Continued)

FOREIGN PATENT DOCUMENTS

DE        19519088 C1    9/1996
EP        0749684 A1    12/1996
(Continued)

OTHER PUBLICATIONS

Extended European Search Report dated Mar. 29, 2017 for European Patent Application No. 15779453.8, filed on Apr. 17, 2015.
(Continued)

*Primary Examiner* — Douglas Hess

(57) ABSTRACT

A conveyor system for transporting sand including a transportation element for moving the sand, and a drive subassembly for moving the transportation element on a predetermined path. The drive subassembly includes a sprocket driven by a motor for moving the transportation element along the predetermined path, and a floating idler wheel supportable by the transportation element and positioned on the predetermined path downstream from the sprocket. The floating idler wheel is movable between an upper location and a lower location, depending on the tension to which the transportation element is subjected. The drive subassembly also includes a limit switch activatable upon the floating
(Continued)

idler wheel moving to the lower location. Upon activation, the limit switch transmits a signal to a motor switch to de-energize the motor.

20 Claims, 43 Drawing Sheets

(51) Int. Cl.
    *B65G 23/24*     (2006.01)
    *B65G 47/74*     (2006.01)
    *B65G 45/12*     (2006.01)
    *A01K 1/015*     (2006.01)
    *B65G 23/26*     (2006.01)
    *B65G 23/44*     (2006.01)
    *B65G 17/40*     (2006.01)
    *B65G 23/06*     (2006.01)
    *B65G 43/02*     (2006.01)

(52) U.S. Cl.
    CPC ............ *B65G 23/26* (2013.01); *B65G 23/44* (2013.01); *B65G 43/02* (2013.01); *B65G 2201/045* (2013.01)

(58) Field of Classification Search
    USPC ...... 198/469.1, 480.1, 502.3, 725, 728, 834, 198/836.1; 119/439, 451
    See application file for complete search history.

(56) References Cited

U.S. PATENT DOCUMENTS

| | | | | |
|---|---|---|---|---|
| 1,791,381 | A * | 2/1931 | Rogers | A01K 1/0135 198/497 |
| 2,263,504 | A * | 11/1941 | Krueger | A01K 1/0128 119/451 |
| 2,516,798 | A | 7/1950 | Peterson | |
| 2,615,798 | A * | 10/1952 | Pitzer | C01F 17/0006 423/21.1 |
| 2,790,537 | A * | 4/1957 | Howe | B65G 25/08 198/601 |
| 2,951,582 | A | 9/1960 | Petraske | |
| 3,105,590 | A * | 10/1963 | Polley | A01K 39/01 198/716 |
| 3,113,663 | A * | 12/1963 | Kitson | B65G 25/08 172/26.5 |
| 3,815,433 | A | 6/1974 | Klotzbach | |
| 5,143,206 | A | 9/1992 | Hoover | |
| 5,289,912 | A * | 3/1994 | Faulstich | B65G 25/04 119/447 |
| 5,662,068 | A * | 9/1997 | Childs | A01K 1/0135 119/451 |
| 5,758,600 | A * | 6/1998 | Jyh | A01K 31/04 119/161 |
| 6,131,727 | A * | 10/2000 | Nelson | B65G 43/02 198/810.02 |
| 6,948,450 | B2 * | 9/2005 | Berg | B65G 25/08 119/451 |
| 7,047,905 | B1 | 5/2006 | Brade | |
| 7,614,365 | B2 * | 11/2009 | Kuhlmann | A01K 1/0135 119/164 |
| 7,827,938 | B2 | 11/2010 | Kuehlmann | |
| 7,918,330 | B2 * | 4/2011 | Bertolini | B65G 19/24 198/716 |
| 8,720,378 | B2 * | 5/2014 | Waybright | A01K 1/01 119/451 |
| 9,374,978 | B2 * | 6/2016 | Beaumont | A01K 1/015 |
| 2001/0015177 | A1 | 8/2001 | Fujji | |
| 2004/0084064 | A1 | 5/2004 | Verderosa et al. | |
| 2008/0105212 | A1 | 5/2008 | Kuehlmann | |
| 2008/0149036 | A1 | 6/2008 | Emery | |
| 2009/0008223 | A1 | 1/2009 | Fujii | |

FOREIGN PATENT DOCUMENTS

| | | |
|---|---|---|
| NL | 1002289 C2 | 8/1997 |
| WO | WO02094011 A1 | 11/2002 |
| WO | WO2014040174 A1 | 3/2014 |
| WO | WO2015157854 A1 | 10/2015 |

OTHER PUBLICATIONS

International Search Report dated Jul. 28, 2015 for International Application No. PCT/CA2015/000259, filed on Apr. 17, 2015.
Machine-generated English translation of WO02094011.
International Search Report dated Nov. 28, 2013 for International Application No. PCT/CA2013/000784, published as WO 2014/040174, filed on Sep. 17, 2013.
Machine-generated English translation of the Abstract of NL 1002289.
Machine-generated English translation of DE 19519088.

* cited by examiner

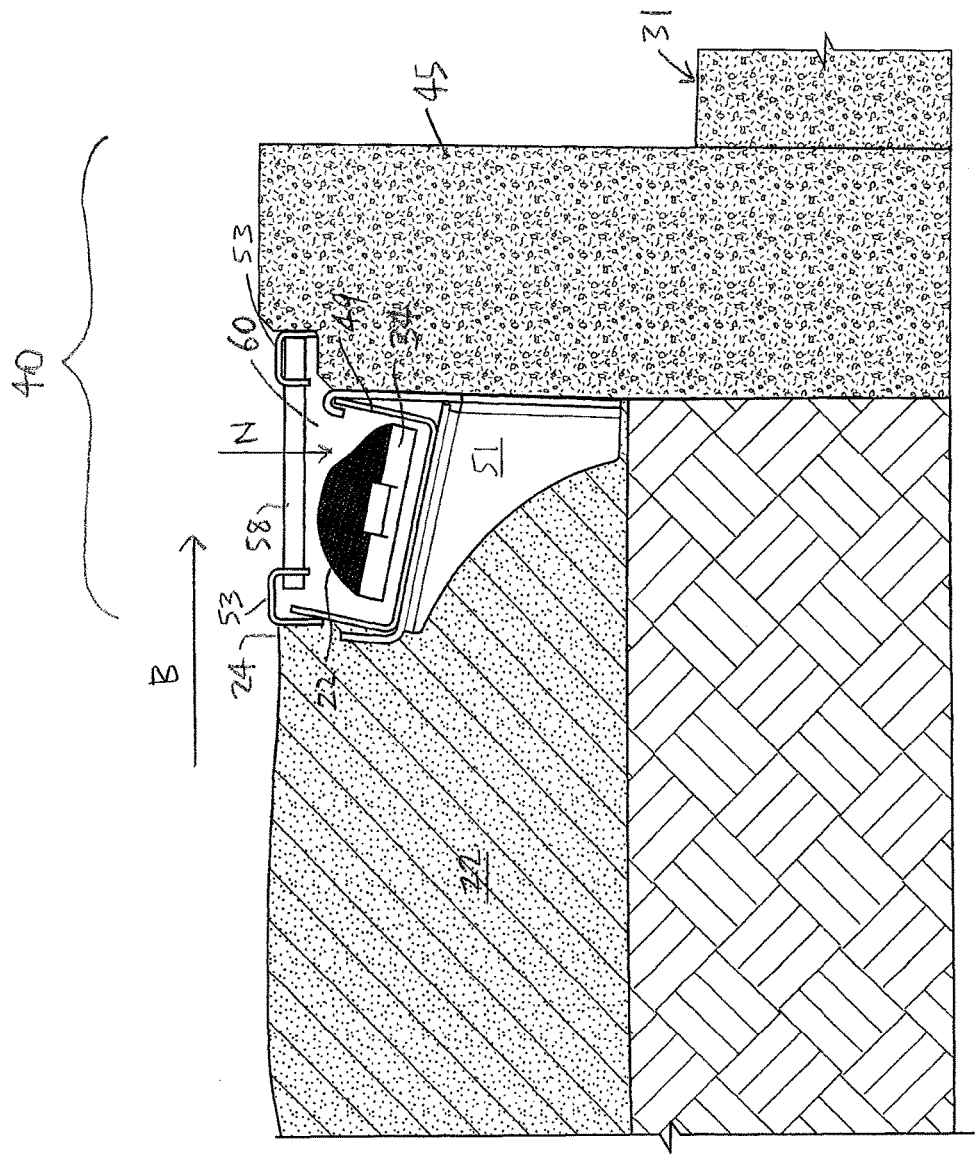

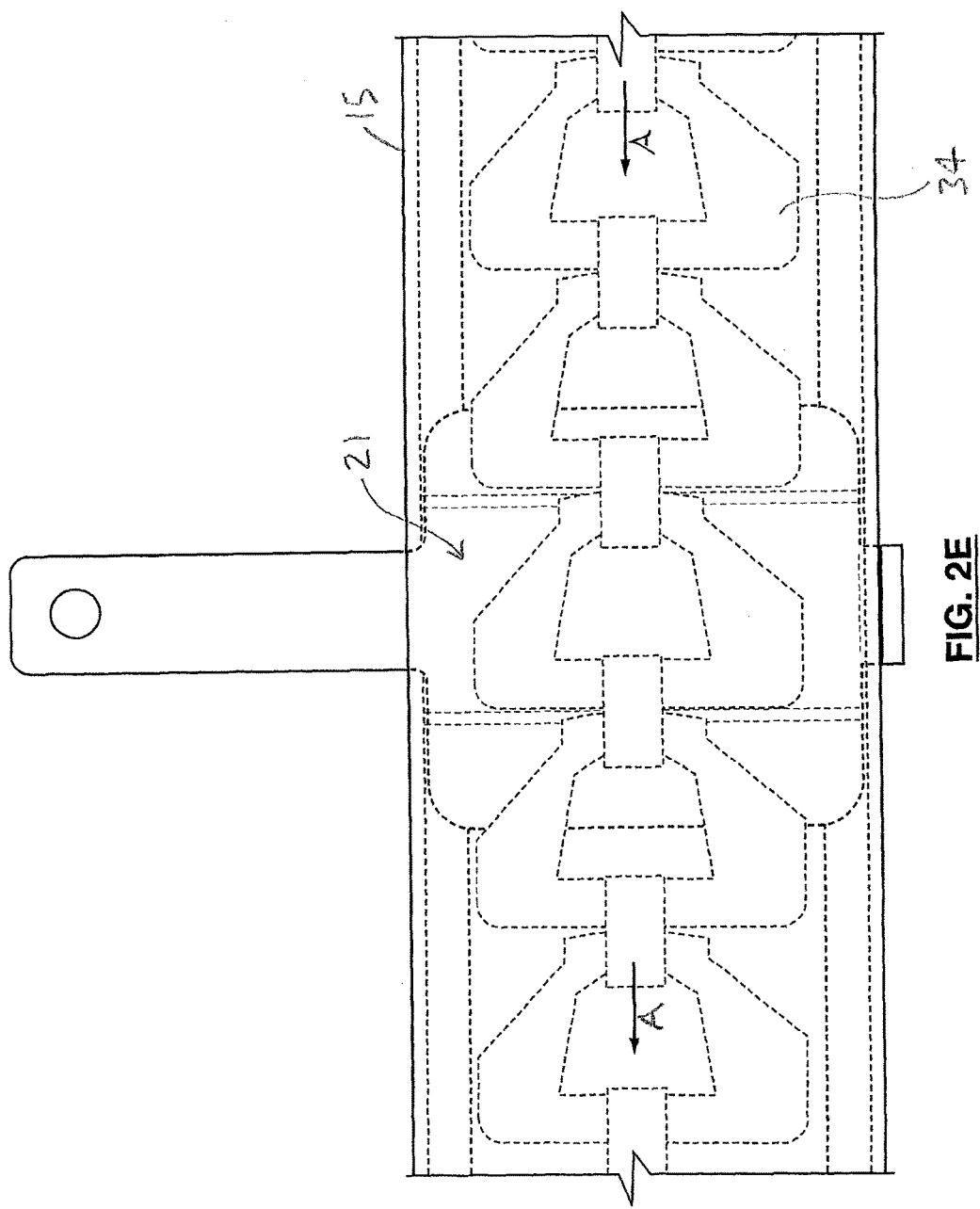

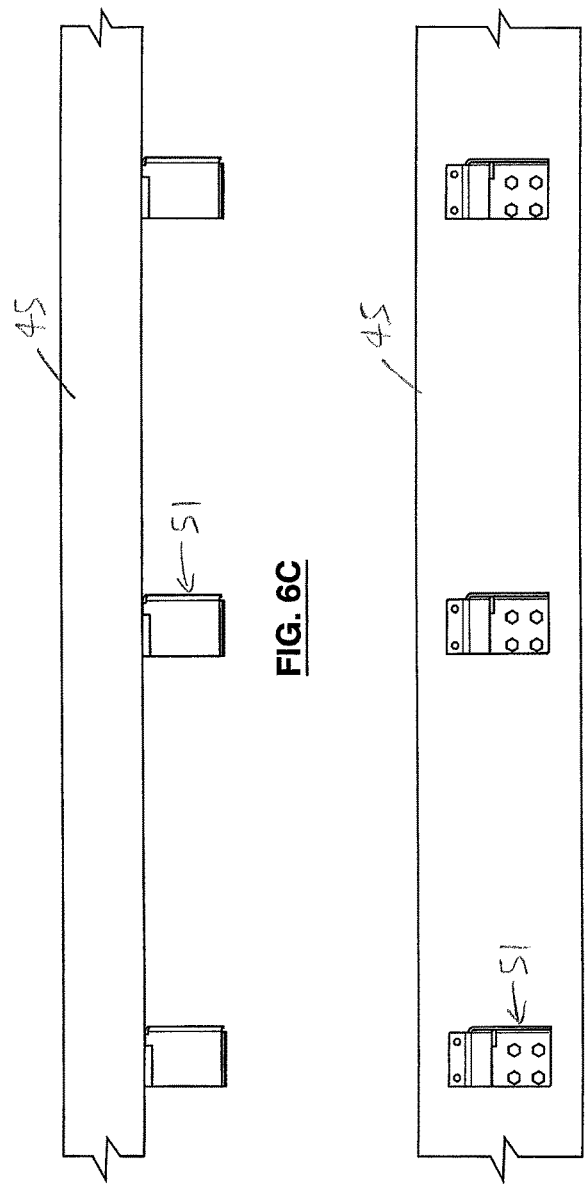

SYSTEM AND METHOD FOR TRANSPORTING SAND

CROSS REFERENCE TO RELATED APPLICATIONS

This application is the national stage entry of International Patent Application No. PCT/CA2015/000259, filed on Apr. 17, 2015, which claims priority to U.S. Provisional Patent Application No. 61/980,822, filed on Apr. 17, 2014, each of which prior applications is incorporated herein by reference. All claims of priority to these applications are hereby made.

FIELD OF THE INVENTION

The present invention is a conveyor system for transporting sand moved from a lower end of an enclosure region in an animal stall to an upper end thereof.

BACKGROUND OF THE INVENTION

In modern stalls for dairy cattle, different bedding materials are used, with different degrees of success. Each of the various bedding materials has its own advantages and disadvantages. As is well known in the art, sand has been found to be an acceptable bedding material, and is capable of providing superior results in terms of cow hygiene and comfort.

One disadvantage of the typical prior art stall is that, in practice, a substantial amount of sand is moved out of the stall and onto the floor of the barn, i.e., into the gutter. Such outward movement of the sand is due to the movement of the cow, as the cow exits the stall. This is generally due to a tendency to shuffle, i.e., the cow drags its hooves over the sand, as the cow backs out of the stall. In this way, each cow moves some sand out of the prior art stall and onto the floor every time it exits the prior art stall.

It has been determined that a surprisingly large amount of sand is removed from the prior art stalls in this way. It is estimated that approximately 45-50 pounds (approximately 20.4-22.7 kg.) of sand is required to be replaced in the typical prior art stall once every day.

As is well known in the art, the floor typically has manure on it. Accordingly, when sand is moved out of the stall and onto the floor as described above, the sand is mixed with the manure, to provide a sand-manure mixture.

This has serious, and costly, consequences, because of the relatively large amounts of sand that are mixed with the manure. As is well known in the art, the manure on the floor is required to be removed regularly, and then processed. Any sand that has become mixed in the manure on the floor is removed with it. Once removed, the sand-manure mixture usually is processed in accordance with typical practices, e.g., the mixture of sand and manure is ultimately spread on fields. However, because of the relatively large amounts of sand involved, the mixture of the sand in the manure typically has significant negative impacts. First, the sand adds significant weight to the material to be processed. Because of the amount of sand which may be mixed into the manure (e.g., in a large barn), the additional weight can be significant. Second, because the sand is abrasive, it causes the processing machinery to wear out more quickly. Finally, the sand lost from the stalls has to be replaced, adding significantly to operating costs.

One solution that has been proposed is to process the sand-manure mixture to remove the sand therefrom, and to clean the sand, so that the manure is free of the sand. However, this adds significant capital costs, because a special machine is needed for removing the sand and cleaning it. Also, the steps of removing and cleaning the sand adds significantly to the operational costs incurred in processing the sand-manure mixture on an ongoing basis. Additional costs are also incurred in connection with moving the cleaned sand back into the stalls.

SUMMARY OF THE INVENTION

There is a need for a system that overcomes or mitigates one or more of the disadvantages or defects of the prior art. Such disadvantages or defects are not necessarily included in those described above.

In its broad aspect, the invention provides a conveyor system for transporting sand moved from a lower end of an enclosure region in at least one animal stall to an upper end of the enclosure region, the stall being positioned adjacent to a gutter. The conveyor system includes a conveyor assembly having a transportation element for moving the sand, a drive subassembly for moving the transportation element in a predetermined direction of travel on a predetermined path between a preselected region that is located between the lower end and the gutter, and the upper end of the enclosure region, and one or more guide subassemblies, for guiding the transportation element along the predetermined path when the transportation element is moved by the drive subassembly. The drive subassembly includes a sprocket for engaging the transportation element, to move the transportation element on the predetermined path, and a motor for rotating the sprocket to move the transportation element, the motor including a motor switch for controlling energization of the motor. The drive subassembly also includes a first idler wheel for guiding the transportation element to the sprocket, a second idler wheel for guiding the transportation element away from the sprocket, and a floating idler wheel positioned on the predetermined path between the sprocket and the second idler wheel. The floating idler wheel is rotatable about an axle, the axle having ends thereof received in substantially vertical slots extending between top and bottom ends thereof to permit vertical movement of the floating idler wheel between an upper location, in which the floating idler wheel is positioned substantially at the top ends of the slots, and a lower location, in which the floating idler wheel is positioned substantially at the bottom ends of the slots in response to variations in tension to which the transportation element is subjected. The drive subassembly also includes a limit switch positioned to be activated upon the floating idler wheel moving to the lower location, the limit switch being configured to transmit a signal to the motor switch to de-energize the motor upon activation of the limit switch.

In another aspect, the drive subassembly additionally includes an exit idler wheel positioned for engagement with the transportation element after the second idler wheel, for guiding the transportation element on the predetermined path.

In another of its aspects, the sprocket and the first and second idler wheels are respectively rotatable about axes thereof positioned for substantial alignment of the first and second idler wheels in a first direction, and the exit idler wheel is rotatable about an exit idler axis positioned for substantial alignment of the exit idler wheel in a second direction that is substantially orthogonal to the first direction.

In yet another aspect, the drive subassembly additionally includes a guide bearing element positioned to guide the transportation element from the second idler wheel to the exit idler wheel.

BRIEF DESCRIPTION OF THE DRAWINGS

The invention will be better understood with reference to the attached drawings, in which:

FIG. 1C is a cross-section of a portion of the stall of FIG. 1B, drawn at a larger scale;

FIG. 2E is a top view of the upper trough, with a part of an embodiment of a transportation element of the invention located therein illustrated in broken lines;

FIG. 6C is a top view of a portion of a curb element with the lower trough support brackets of FIG. 6B secured thereto;

FIG. 6D is a front view of the curb element of FIG. 6C with the lower trough support brackets mounted thereon;

DETAILED DESCRIPTION

Figure 1A:
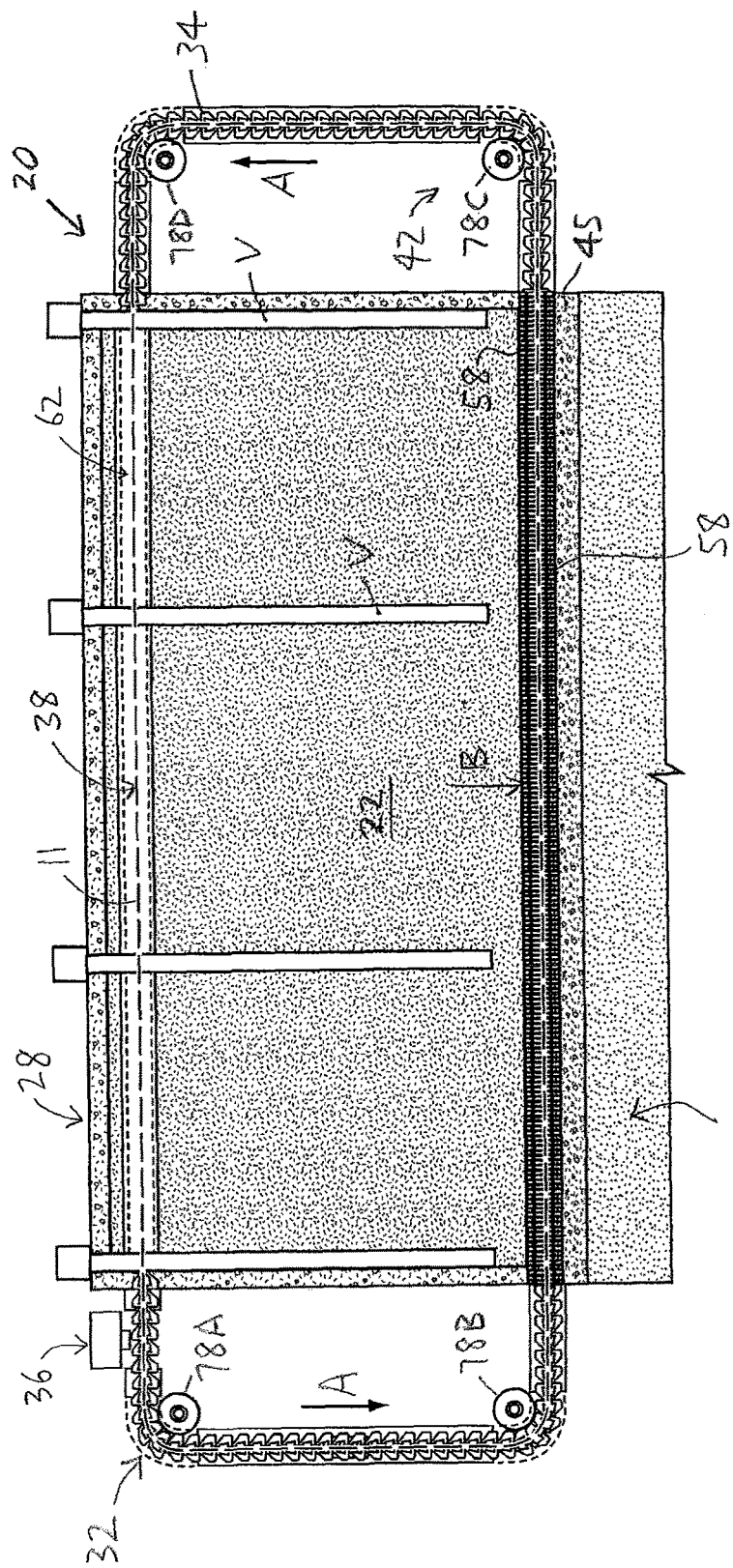
FIG. 1A is a top view of an embodiment of a system of the invention.

In the attached drawings, like reference numerals designate corresponding elements throughout. Reference is first made to FIGS. 1A-1F and 2A-7F to describe an embodiment of a conveyor system in accordance with the invention indicated generally by the numeral 20. The conveyor system 20 is for transporting sand 22 moved from a lower end 24 of an enclosure region 26 in one or more animal stalls 28 (FIG. 1A) to an upper end 30 of the enclosure region 26 (FIG. 1B), as will be described. As can be seen in FIG. 1A, the stall 28 is positioned adjacent to a gutter 31. In one embodiment, the conveyor system 20 preferably includes a conveyor assembly 32 having a transportation element 34 (FIG. 1E) for moving the sand 22, and a drive subassembly 36 (FIGS. 5A-5D) for moving the transportation element 34 in a predetermined direction of travel on a predetermined path 38 (FIG. 1A) between the upper end 30 of the enclosure region 26 and a preselected region 40 that is located between the lower end 24 and the gutter 31. It is also preferred that the conveyor assembly 32 includes one or more guide subassemblies 42, for guiding the transportation element 34 along the predetermined path 38 when the transportation element 34 is moved by the drive subassembly 36.

Figure 1B:
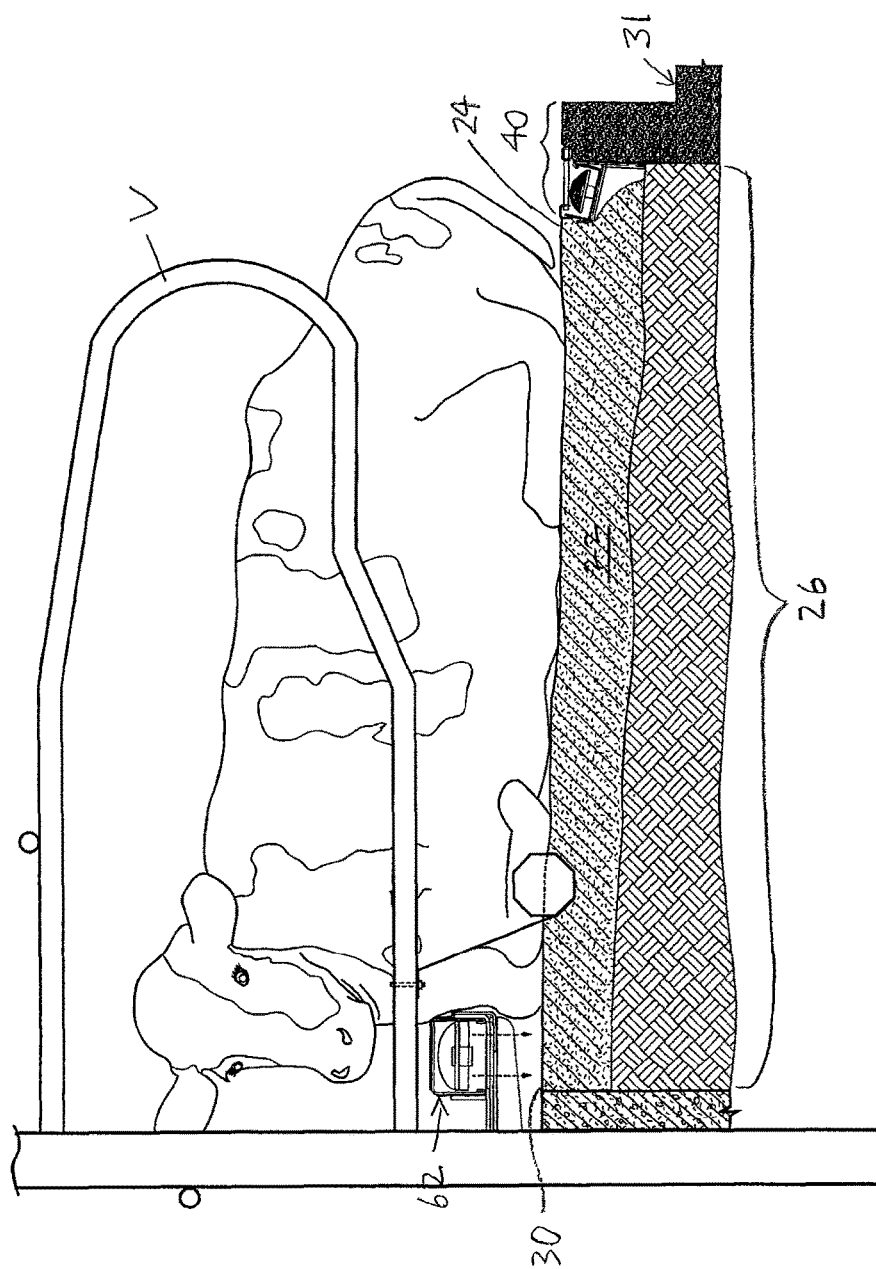
FIG. 1B is a partial cross-section of an embodiment of a stall of the invention, drawn at a larger scale.
Figure 1D:
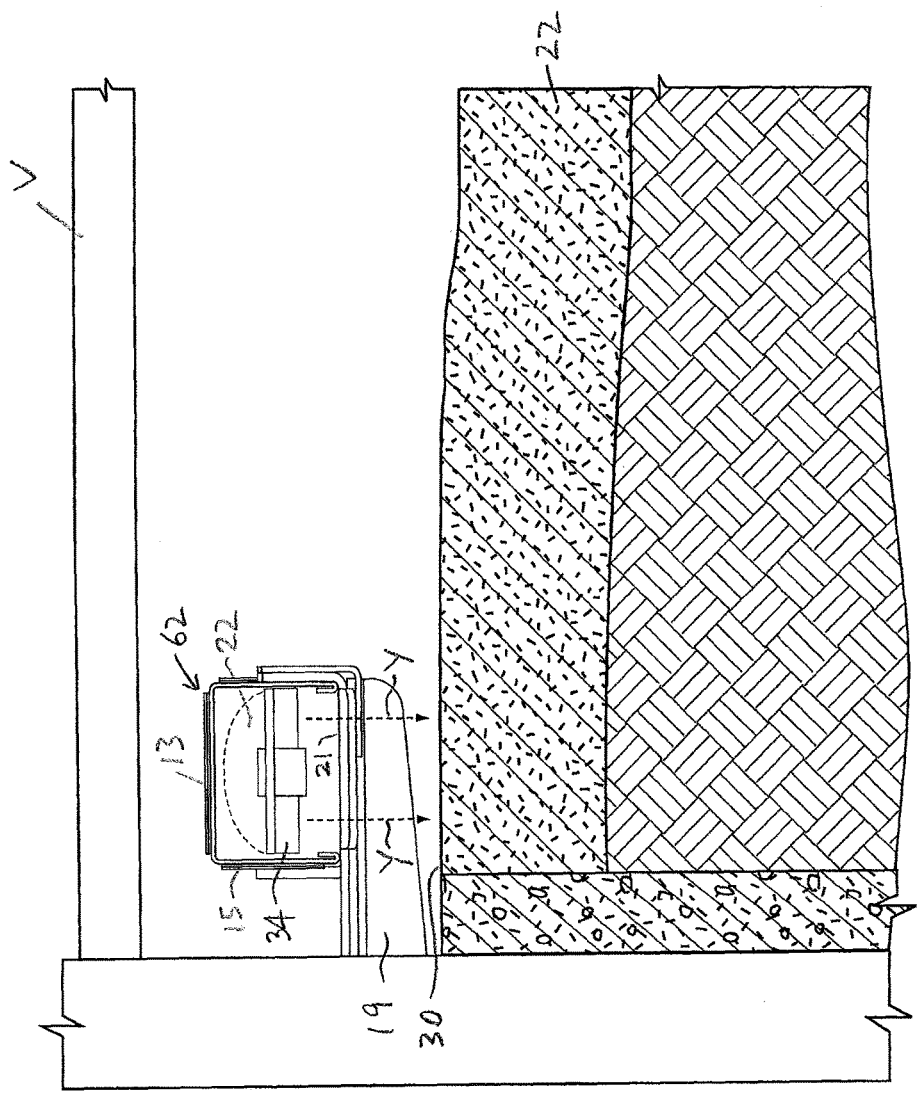
FIG. 1D is a cross-section of another portion of the stall of FIG. 1B.
Figure 1E:
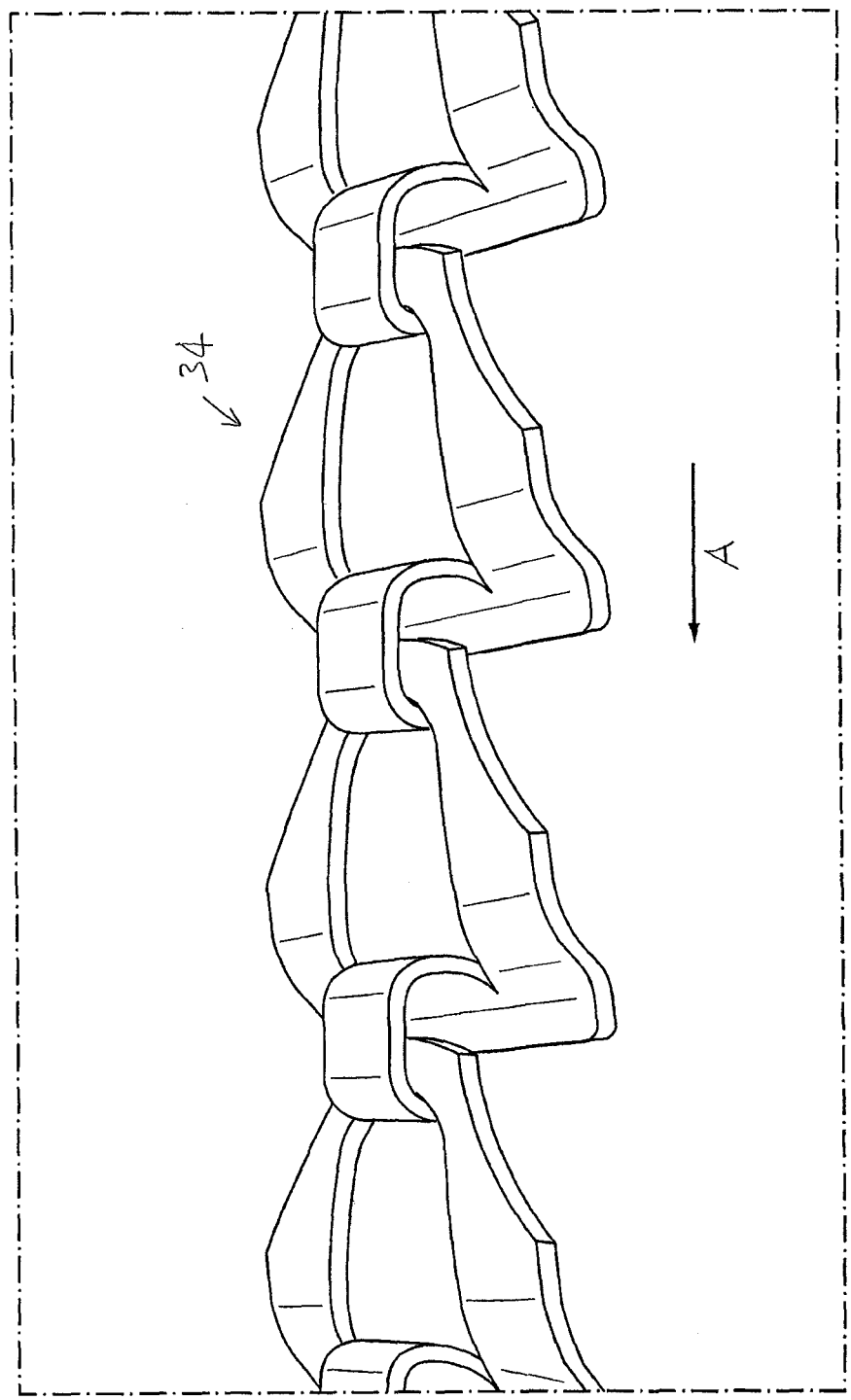
FIG. 1E is an isometric view of an embodiment of the transportation element of the invention, drawn at a larger scale.
Figure 1F:
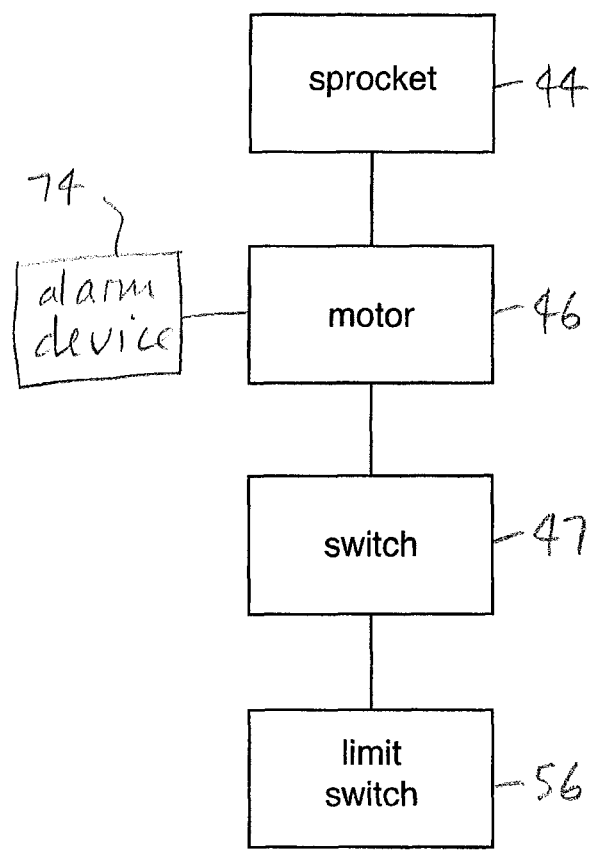
FIG. 1F is a block diagram schematically illustrating the connection of a limit switch and a switch of a motor in one embodiment of a drive subassembly of the invention.
Figure 5A:
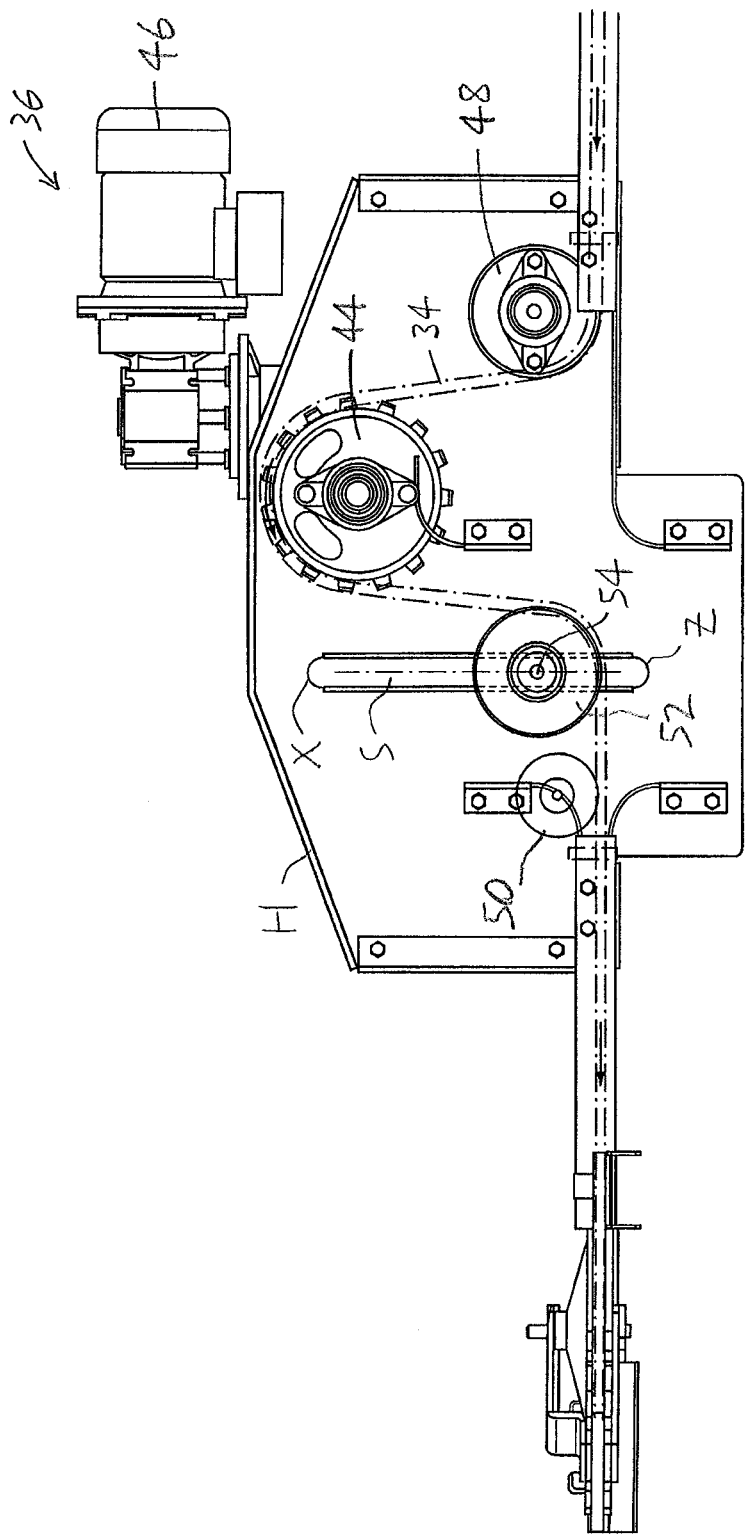
FIG. 5A is a side view of an embodiment of the drive subassembly of the invention in which a floating idler wheel is located at an intermediate location relative to a slot along which it is movable, drawn at a smaller scale.

Preferably, and as can be seen in FIG. 5A, the drive subassembly 36 includes a sprocket 44 for engaging the transportation element 34 to move the transportation element 34 on the predetermined path 38 and a motor 46 for rotating the sprocket 44, to move the transportation element 34. It will be understood that the teeth of the sprocket engage the chain (transportation element) 34. It is also preferred that the motor 46 includes a motor switch or relay 47 for controlling energization of the motor 46 (FIG. 1F). In one embodiment, the drive subassembly 36 preferably also includes a first idler wheel 48 for guiding the transportation element 34 to the sprocket 44, a second idler wheel 50 for guiding the transportation element 34 away from the sprocket 44, and a floating idler wheel 52 positioned on the predetermined path 38 between the sprocket 44 and the second idler wheel 50.

Preferably, the floating idler wheel 52 is rotatable about an axle 54, and the ends 55 of the axle 54 are received in substantially vertical slots "S" (FIGS. 5D, 5E) extending between top and bottom ends thereof "X", "Z" to permit vertical movement of the floating idler wheel 52 between an upper location "U" (FIG. 5B), in which the floating idler wheel 52 is positioned substantially at the top end "X" of the slots "S", and a lower location "L" (FIG. 5C), in which the floating idler wheel 52 is positioned substantially at the bottom end "Z" of the slots "S", in response to variations in tension to which the transportation element 34 is subjected. As will be described, the drive subassembly 36 preferably also includes a limit switch 56 (FIG. 5E) activated upon the floating idler wheel 52 moving to the lower location "L". Preferably, the limit switch 56 is configured to transmit a signal to the motor switch 47 to de-energize the motor 46 upon activation of the limit switch 56.

Those skilled in the art would appreciate that the predetermined path 38 may have any suitable configuration, and preferably is selected for movement of the sand in relation to selected stalls, as described above. For exemplary purposes, the predetermined path 38 of the transportation element 34 is indicated in FIG. 1A. The predetermined direction in which the transportation element 34 is moved by the drive subassembly 36 is indicated by arrow "A" in FIG. 1A. Those skilled in the art would appreciate that the direction of travel may be clockwise or counter-clockwise, as preferred, and the direction shown in FIG. 1A is exemplary only. It will be understood that the predetermined path 38 may be located in relation to any suitable number of stalls 28.

The transportation element 34 may be any suitable chain or belt or other device. For example, the transportation element may be an auger, a pneumatic conveyor, or a flexible auger, among other things. An exemplary transportation element 34, a chain, is illustrated in FIG. 1E. As is known in the art, the chain 34 includes links that are connected to each other in any suitable manner. Those skilled in the art would appreciate that, in use, the chain preferably is subjected to tension so that it is substantially taut while the system is operating.

As can be seen in FIG. 1A, the predetermined path 38 includes right angle (or approximately right angle) turns at corners. Because of this, the links 58 preferably are joined together so as to permit substantial pivoting movement of a leading link relative to a trailing link that is connected to it, and follows it as the transportation element 36 is moved along the predetermined path 38.

It has been found that, during operation, different parts of the transportation element or chain 34 are subjected to tension to varying extents. In particular, a part of the chain is subjected to greater tension when it engages a pulley at a corner of the predetermined path. Also, it has been found that damp sand, due to its greater density and its reduced flowability as compared to relatively dry sand, results in the chain being subjected to significantly greater tension than dry sand.

By way of example, in ordinary operation, the chain may be subjected to tension of up to about 900 N (approximately 202.3 lbf). As noted above, however, the chain may be subjected to higher tensions in non-ideal circumstances. It has been found that various factors, e.g., the relative humidity, and moisture content of the sand, may affect the tension to which the chain is subjected. Those skilled in the art would appreciate that the extent to which the chain may safely be subjected to tension also depends on a number of factors, e.g., certain characteristics of the chain, and of the drive subassembly.

It has been found that, for optimal results, the system 20 preferably is operated substantially continually. As described above, when a cow "C" (FIG. 1B) exits the stall 28, some of the sand 22 in the stall 28 is moved outwardly (i.e., in the direction indicated by arrow "B" in FIG. 1A) by the cow. At least a portion of the sand that is so moved falls through a grate 58 into a lower trough 60 (FIGS. 1B, 1C). As will be described, the sand that is so moved by the cow is generally caught by the part of the transportation element 34 that is moving through the lower trough 60 at that time. The sand-laden part of the transportation element 34 is moved along the predetermined path 38 from the lower trough 60 to the upper ends 30. It is preferred that the transportation element 34 moves through an upper trough 62 positioned above the upper end(s) 30 of the enclosure region(s) 26. As the transportation element 34 moves through the upper trough 62, the sand falls off the transportation element 34 onto the upper end 30. The movement of the sand from the transportation element 34 onto the upper end 30 is schematically represented by arrow "Y" in FIG. 1D. In this way, the sand 22 that otherwise might be moved into the gutter 31 (and thereby contaminated by urine and feces in the gutter 31 as a result) is instead moved to the upper end(s) 30, so it can be reused in the stall(s) 40.

An exemplary configuration is illustrated in FIG. 1A. In this configuration, the sand in four stalls is moved by the conveyor assembly 32. The stalls are separated from each other by dividers "V", as is known. From FIG. 1A, it can be appreciated that the sand 22 may be moved into the lower trough 60 at any particular time from all or only certain of the stalls, depending on the movements of the cows (not shown in FIG. 1A) in the stalls. Similarly, the sand 22 that is moved by the transportation element 34 from the preselected region 40 may be dropped onto the upper ends 30 of any of the enclosure regions 26, i.e., in any (or all) of the stalls 40. Those skilled in the art would appreciate that, in practice, manual rearrangement of the sand thus deposited at the upper ends may be desirable from time to time, to spread the sand generally evenly at the upper ends 30. In practice, the operator may observe a sand flow profile, i.e., the manner in which the sand that has fallen off the transportation element and landed at the upper end 30 flows when it accumulates. Those skilled in the art would appreciate that dry sand tends to flow relatively well under the influence of gravity, generally flattening out to approximately its natural angle of repose. However, wet sand, or sand contaminated with fecal matter mixed into it, tends to pile up, to form more vertical faces. It will be understood that, in practice, wet or contaminated sand, when it appears at the upper end, can expeditiously be removed manually.

Those skilled in the art would also appreciate that, over time, the chain 34 gradually tends to lengthen or stretch, due to the tension to which it is subjected. From time to time, therefore, the chain may be shortened, in order to subject the chain to tension to the appropriate extent. As will be described, the system 20 preferably includes features to subject the chain to an appropriate tension while operating, and also to enable the chain to be safely and conveniently shortened when necessary.

As can be seen in FIG. 5A, when the transportation element 34 is subjected to the appropriate tension, the floating idler wheel 52 preferably is positioned in an intermediate location, i.e., between the top and bottom ends "X", "Z" of the slots "S" in a housing "H" of the drive subassembly 36. It will be understood that, in one embodiment, the floating idler wheel 52 preferably is positioned in the slot "S" under the influence of gravity, and supported by the transportation element 34, which engages the floating idler wheel 52 as it passes underneath the floating idler wheel 52. Also, the floating idler wheel 52 functions as a self-tensioning device, i.e., the floating idler wheel 52, because it presses downwardly on the chain due to the influence of gravity, also subjects the chain to tension. The position of the floating idler wheel 52 in the slot is determined by the extent to which the transportation element or chain 34 is subjected to tension.

Figure 5B:
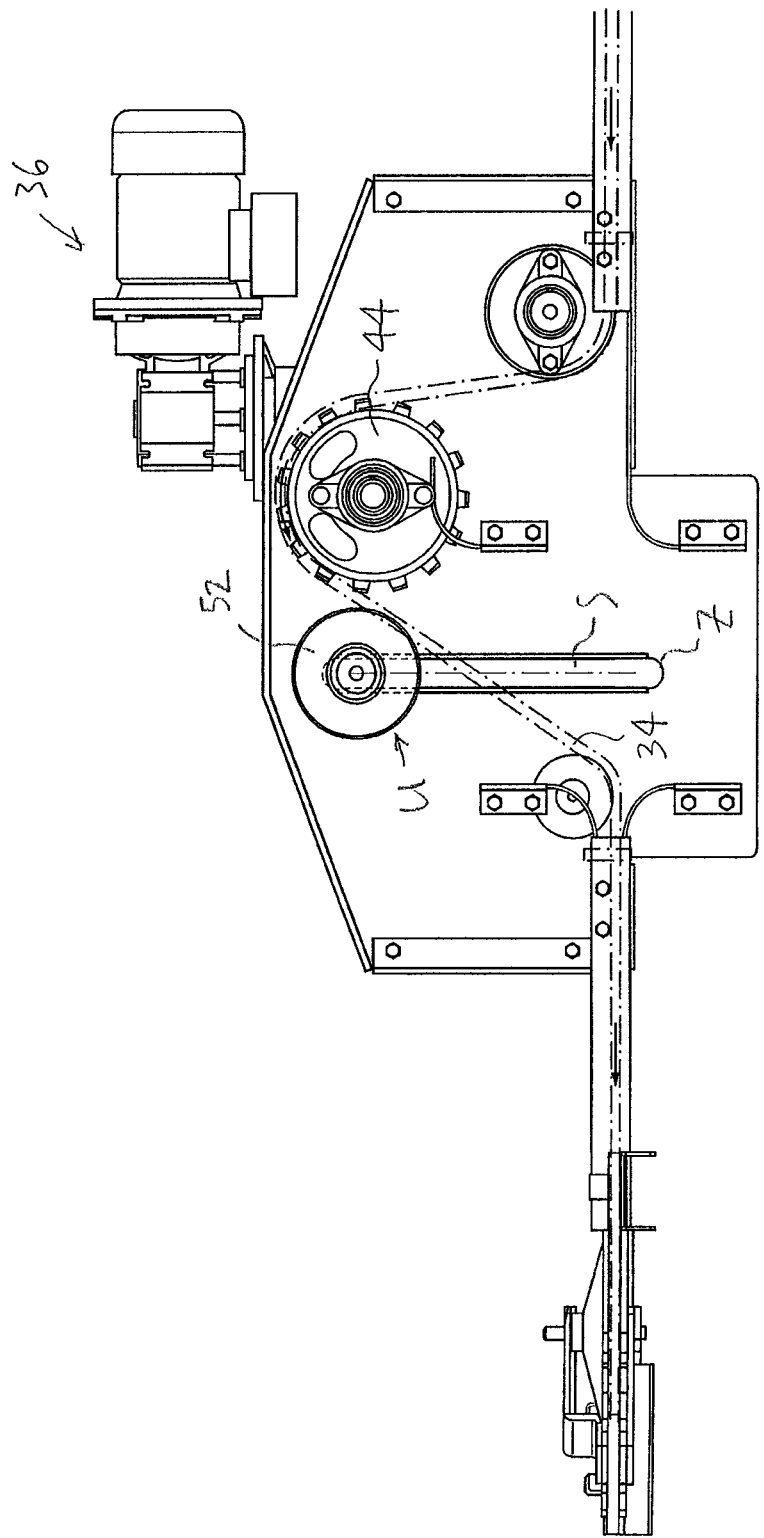
FIG. 5B is a side view of the drive subassembly of FIG. 5A in which the floating idler wheel is positioned at an upper location relative to the slot.
Figure 5C:
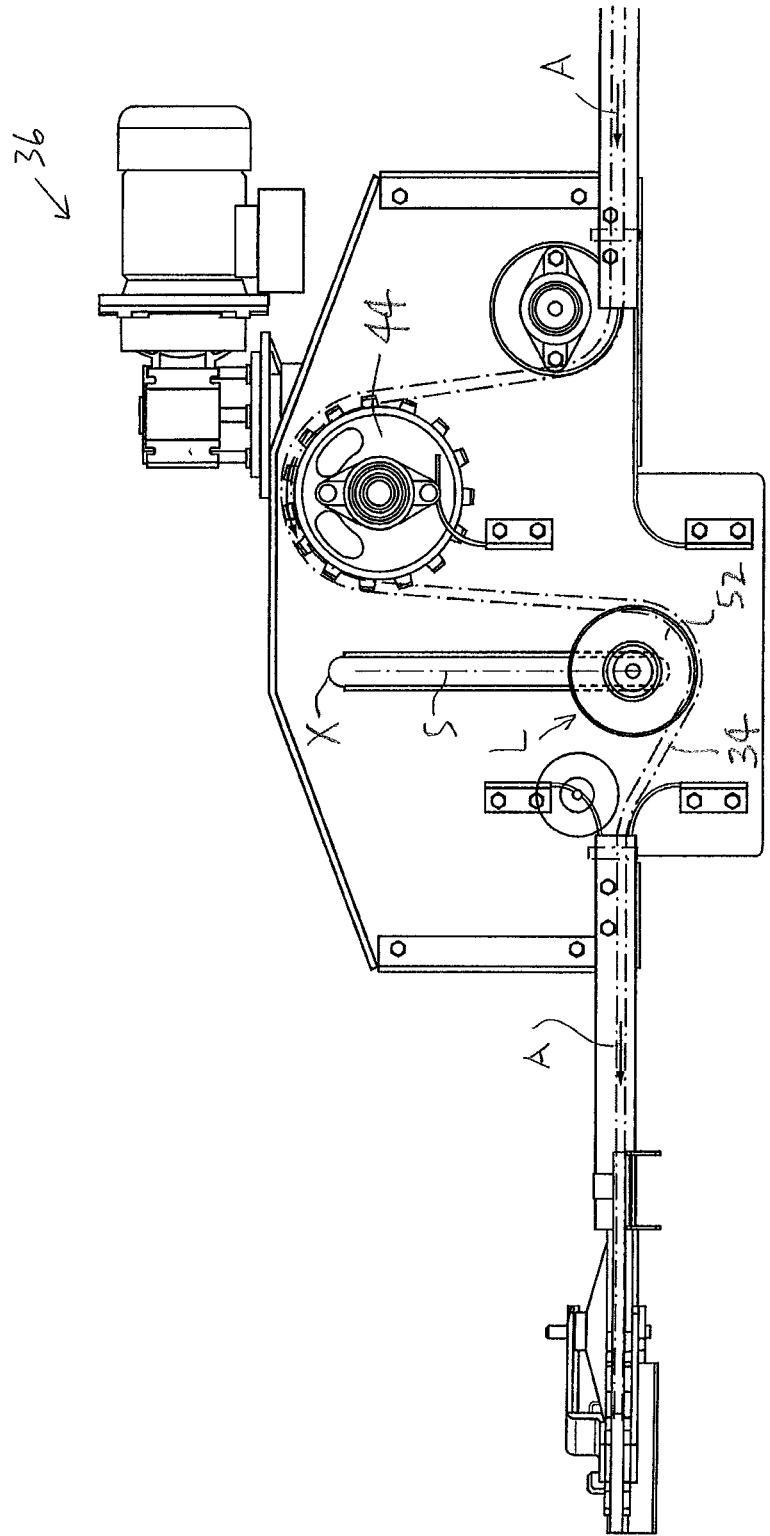
FIG. 5C is a side view of the drive subassembly of FIGS. 5A and 5B in which the floating idler wheel is positioned at a lower location relative to the slot.

For example, the intermediate position of the floating idler wheel 52 as illustrated in FIG. 5A indicates that the transportation element 34 is subjected to average tension, i.e., the system is functioning normally. Other, less ideal, situations are illustrated in FIGS. 5B and 5C. The location of the floating idler wheel 52 substantially at the top of the slot in FIG. 5B indicates that the transportation element 34 is being subjected to substantial tension. In FIG. 5C, the floating idler wheel 52 is shown in a lower location, at the bottom end of the slots. This indicates that the transportation element is subjected to very little tension, or possibly no tension.

It will be appreciated by those skilled in the art that an operator (not shown) may, by observing the location of the stop elements 64 relative to the slot, quickly and easily see whether the transportation element is subjected to tension to a generally normal extent, or otherwise. For example, if the operator observes that the floating idler wheel is positioned as shown in FIG. 5B, the operator should take steps immediately to determine why the chain is subjected to an unusually high tension.

Figure 5D:
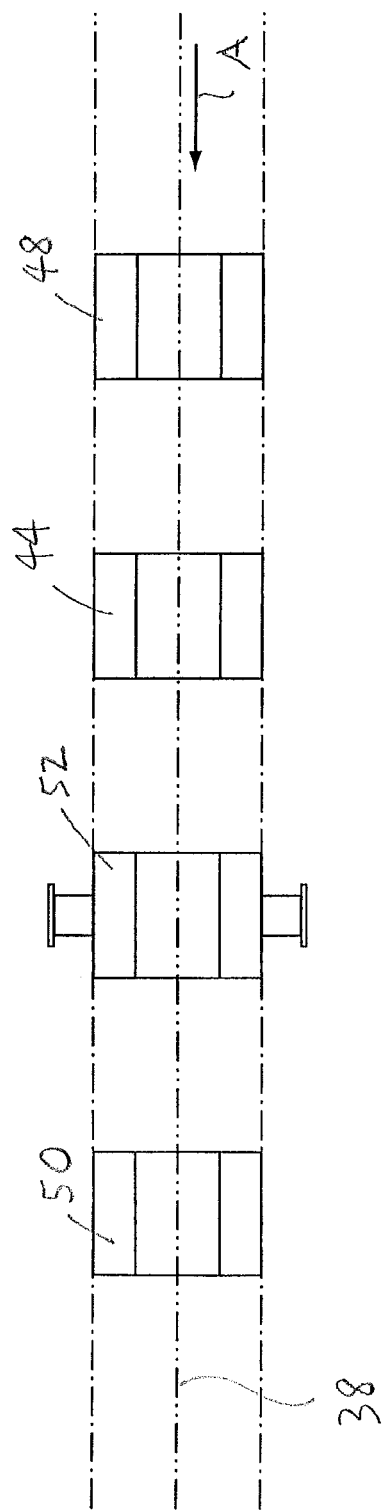
FIG. 5D is a top view of selected elements of the drive subassembly of FIG. 5A.
Figure 5E:
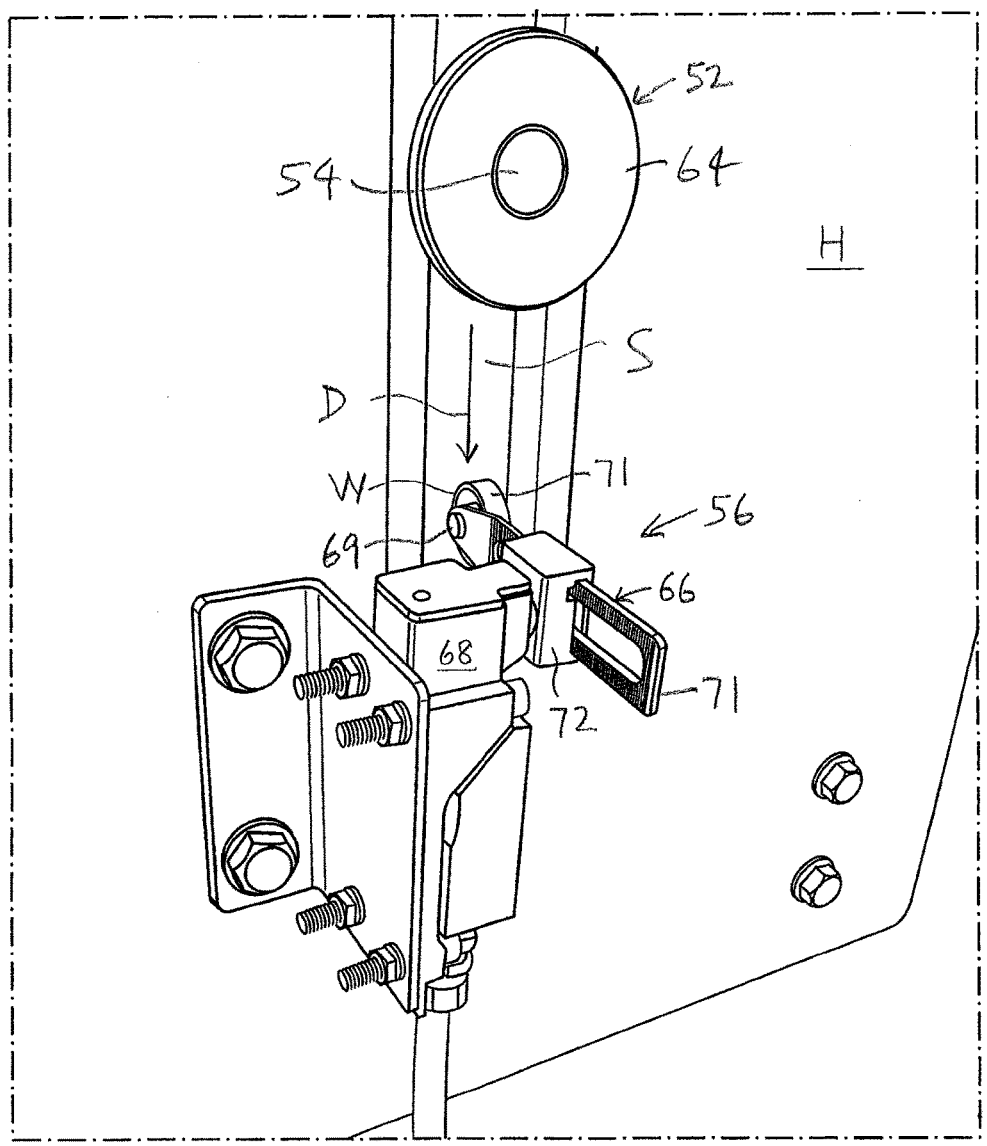
FIG. 5E is an isometric view of a limit switch device of the drive subassembly of FIGS. 5A-5D.

As can be seen in FIGS. 5D and 5E, in one embodiment, the floating idler wheel 52 preferably includes stop elements 64 that are mounted on the ends of the axle 54 of the floating idler wheel 52. The stop elements 64 keep the axle 54 located in the slots "S" as the floating idler wheel 52 engages the transportation element 34 and moves vertically in the slot "S", in response to changes in the tension in the transportation element 34.

It will be noted that the direction of travel of the transportation element 34 is from right to left, as illustrated in FIGS. 5A-5C. Accordingly, it will be appreciated that, when there is an impediment to movement of the transportation element 34, the tension to which the part of the transportation element 34 that is downstream from the sprocket 44 is subjected decreases rapidly. For example, if the transportation element 34 is stopped outside the drive subassembly 36, the sprocket 44 continues to attempt to move the transportation element 34, but the transportation element's failure to move results in the chain being somewhat compressed (or not extended) downstream relative to the sprocket 44, and extended (i.e., subjected to tension) upstream relative to the sprocket 44, between the location where the chain is stopped and the sprocket 44.

The result is that, when the movement of the transportation element 34 is stopped, because the part of the chain engaged with the floating idler wheel 52 is then subjected to no tension (or very little tension), the floating idler wheel 52 moves vertically downwardly in the slot "S" to the lower location (FIG. 5C). When the floating idler wheel 52 moves to the lower location (i.e., in the direction indicated by arrow "D" in FIG. 5E), it trips the lower limit switch 56. As schematically illustrated in FIG. 1F, the limit switch 56 is electrically connected with the motor switch 47, and when the limit switch 56 is so tripped, it causes the motor switch 47 to de-energize the motor 46.

Those skilled in the art would appreciate that various forms of limit switches are available that would be suitable. For example, in the embodiment of the limit switch 56 illustrated in FIG. 5E, the limit switch 56 preferably includes an arm 66 pivotably mounted on a body 68. Preferably, the body 68 is mounted so that it is stationary relative to the slot "S", e.g., the body 68 is secured to the housing "H". As can be seen in FIG. 5E, the arm 66 extends between first and second ends 69, 70 and has an engagement element 71 mounted on the first end 69 thereof, for engagement with the floating idler wheel 52, as will be described. The arm 66 is pivotably mounted to the body 68 at a central part 72 of the arm 66.

When the floating idler wheel 52 moves downwardly (i.e., in the direction indicated by arrow "D" in FIG. 5E) to the lower location thereof (illustrated in FIG. 5C), the stop element 64 of the floating idler wheel 52 engages the engagement element 71, pushing the engagement element 71 downwardly, causing the first end 69 also to move (i.e., pivot) downwardly. When the engagement element 71 is so engaged, the first end 69 of the arm 66 pivots downwardly, and the second end 70 pivots upwardly, i.e., the arm 66 pivots about its central part 72. Although the engagement element 72 preferably includes a wheel "W" engageable with the floating idler wheel 52, it would be appreciated by those skilled in the art that the engagement element may be provided in various forms.

As is known in the art, the body 68 includes electrical contacts (not shown) that are positioned for activation by pivoting movement of the arm 66. Pivoting movement of the arm 66 preferably causes an appropriate signal to be sent to the motor switch or controller 47 of the motor 46 that controls the supply of electric power to the motor 46. Accordingly, when the engagement element 71 and the first end 69 of the arm 66 are moved sufficiently downwardly, the limit switch 56 is activated, and sends the appropriate "de-energization" message to the motor switch 47. Preferably, the arm 66 is biased to a rest position in which it is located substantially horizontal. When the floating idler wheel 52 is moved upwardly in the slot (i.e., upwardly from the lower location), the arm 66 returns to its rest position, and the limit switch 56 sends the appropriate "energization" message to the motor switch 47. The limit switch 56 is of conventional construction, and further description thereof is therefore not necessary.

Those skilled in the art would be aware that the limit switch 56 as illustrated is exemplary only, and that the limit switch may be in any suitable one of various known configurations. For instance, the engagement element 71 may be provided in various forms.

As noted above, a blockage or any impediment that slows or stops the movement of the transportation element 34 would cause the part of the transportation element 34 that is engaged with the floating idler wheel 52 to be subjected to relatively less tension, and possibly to virtually no tension. As will be described, such blockages may result from accumulations of relatively wet sand, i.e., sand with a high moisture content. The moisture may be due to urine from the cows. Alternatively, or in addition, fecal matter may become mixed with the sand, and significantly slow or stop movement of the transportation element 34 along the predetermined path 38.

From the foregoing, it can be seen that, due to the floating idler wheel 52 and the limit switch 56, the transportation element 34 of the system 20 stops (i.e., the motor 46 is de-energized) promptly when the part of the transportation element 34 engaged with the floating idler wheel 52 is subjected to no tension, or to very little tension. In this regard, the floating idler wheel 52 and the limit switch 56 are a significant safety feature that permits the system 20 to be operated safely without the operator necessarily being present at all times. In particular, because the system 20 preferably is operated continuously, the limit switch is an important safety feature.

Figure 5F:
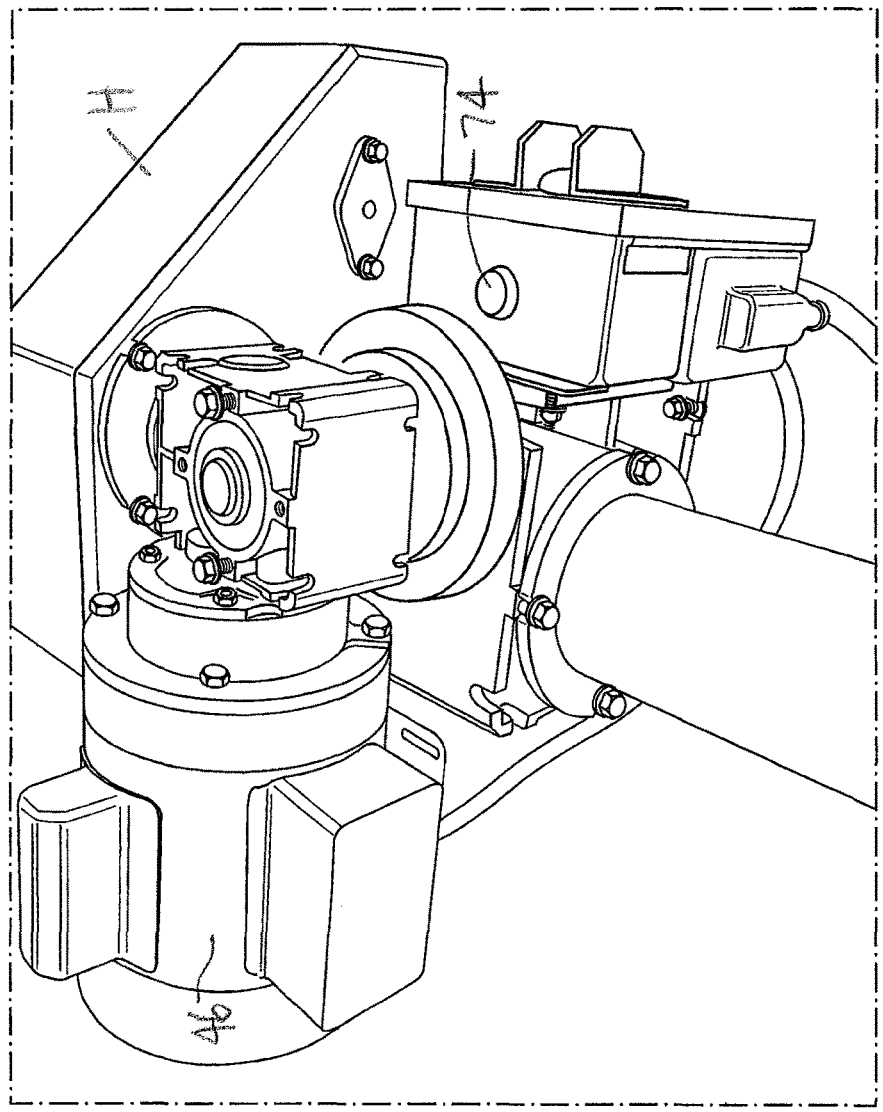
FIG. 5F is an isometric view of an embodiment of a motor of the drive subassembly of FIG. 5A.

In one embodiment, and as illustrated in FIGS. 1F and 5F, the drive subassembly 36 preferably additionally includes an alarm device 74 for providing an alarm signal when the motor 46 is de-energized upon activation of the limit switch 56. Preferably, the alarm device 74 detects the de-energization of the motor 46, and upon such de-energization, generates an alarm signal. The alarm signal may be one or more of a visual signal (e.g., a light source that is energized), an audible signal, or any kind of electronically transmitted message (e.g., an e-mail or text message). Those skilled in the art would appreciate that this feature permits the operator to be informed of a shut-down even when the operator is not on site. For example, if an e-mail or text message is sent by the alarm device 74 to the operator's cell phone or mobile computing device, the operator, upon his receipt of the message, may take appropriate action, even if not at the site.

For the purposes hereof, a "downstream" object in relation to a second object is understood to be positioned spaced apart from the second object in the predetermined direction, on the predetermined path. Also, for the purposes hereof, an "upstream" object in relation to a third object is understood to be positioned spaced apart from the third object in a direction opposite to the predetermined direction, on the predetermined path.

Figure 4A:
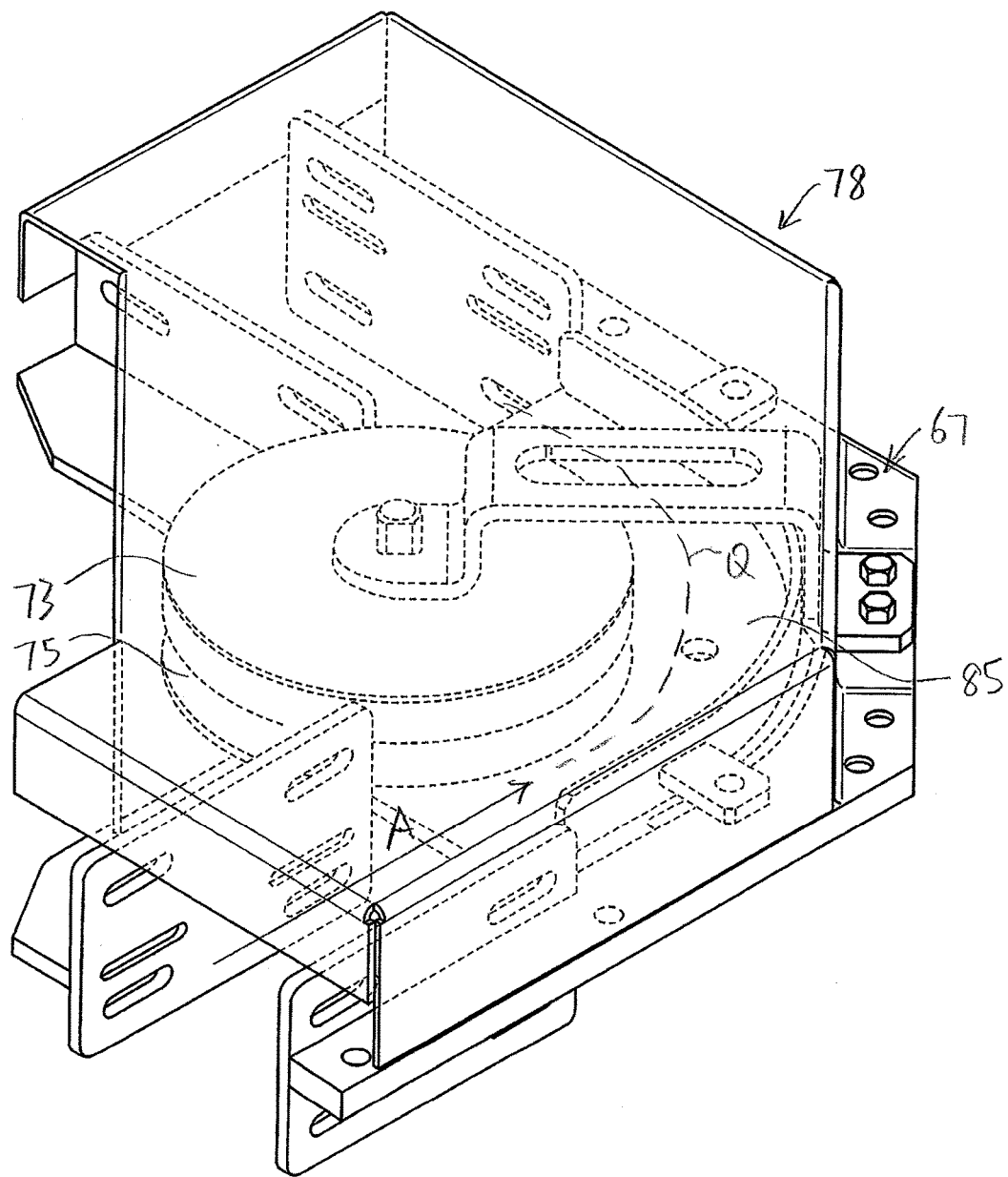
FIG. 4A is an isometric view of an embodiment of a corner wheel subassembly of the invention, drawn at a larger scale.

As will be described, the guide subassembly 42 preferably includes four corner wheel subassemblies 78 (FIG. 4A). For convenience, the corner wheel subassemblies illustrated in FIG. 1A are identified by reference numerals 78A-78D respectively. As can be seen in FIG. 4A, the corner wheel subassembly 78 preferably includes a pulley 73. It will be understood that, in FIG. 1A, only the pulley 73 of each corner wheel subassembly 78 is illustrated, for clarity of illustration.

Figure 9:
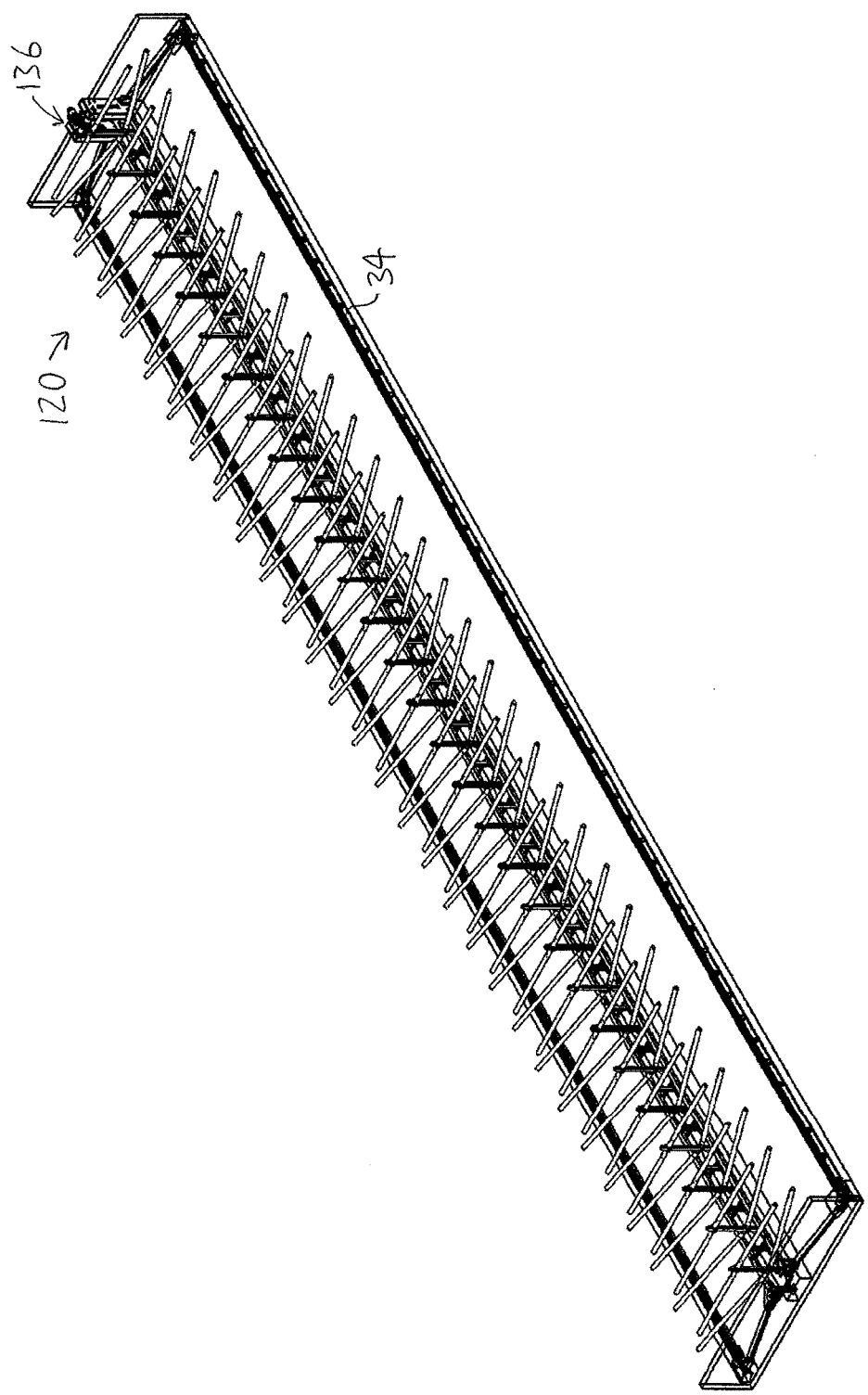
FIG. 9 is an isometric view of an alternative embodiment of the conveyor system of the invention, drawn at a smaller scale.
Figure 10A:
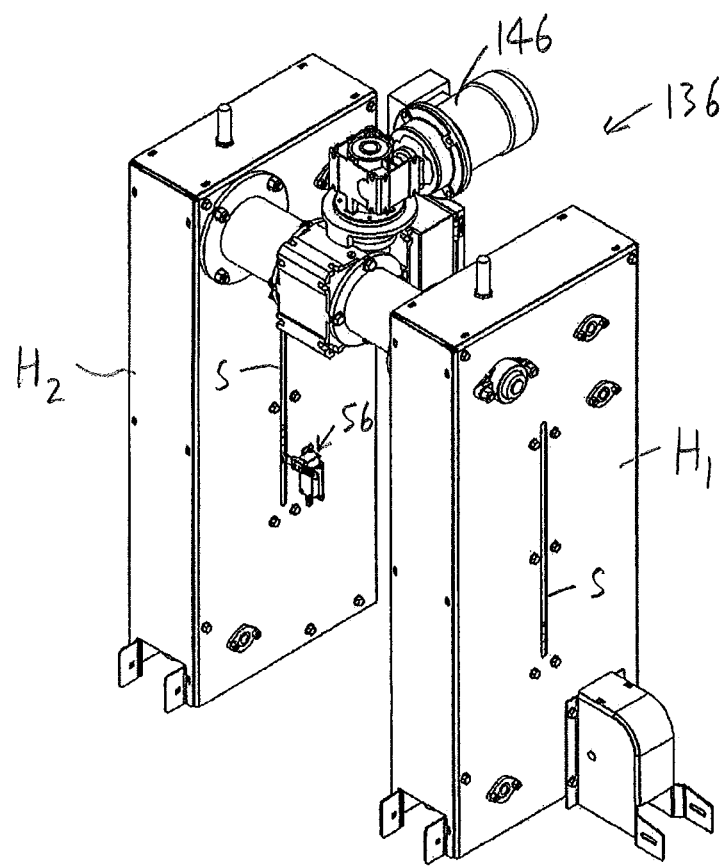
FIG. 10A is an isometric view of an alternative embodiment of the drive subassembly of the invention, drawn at a larger scale.
Figure 10B:
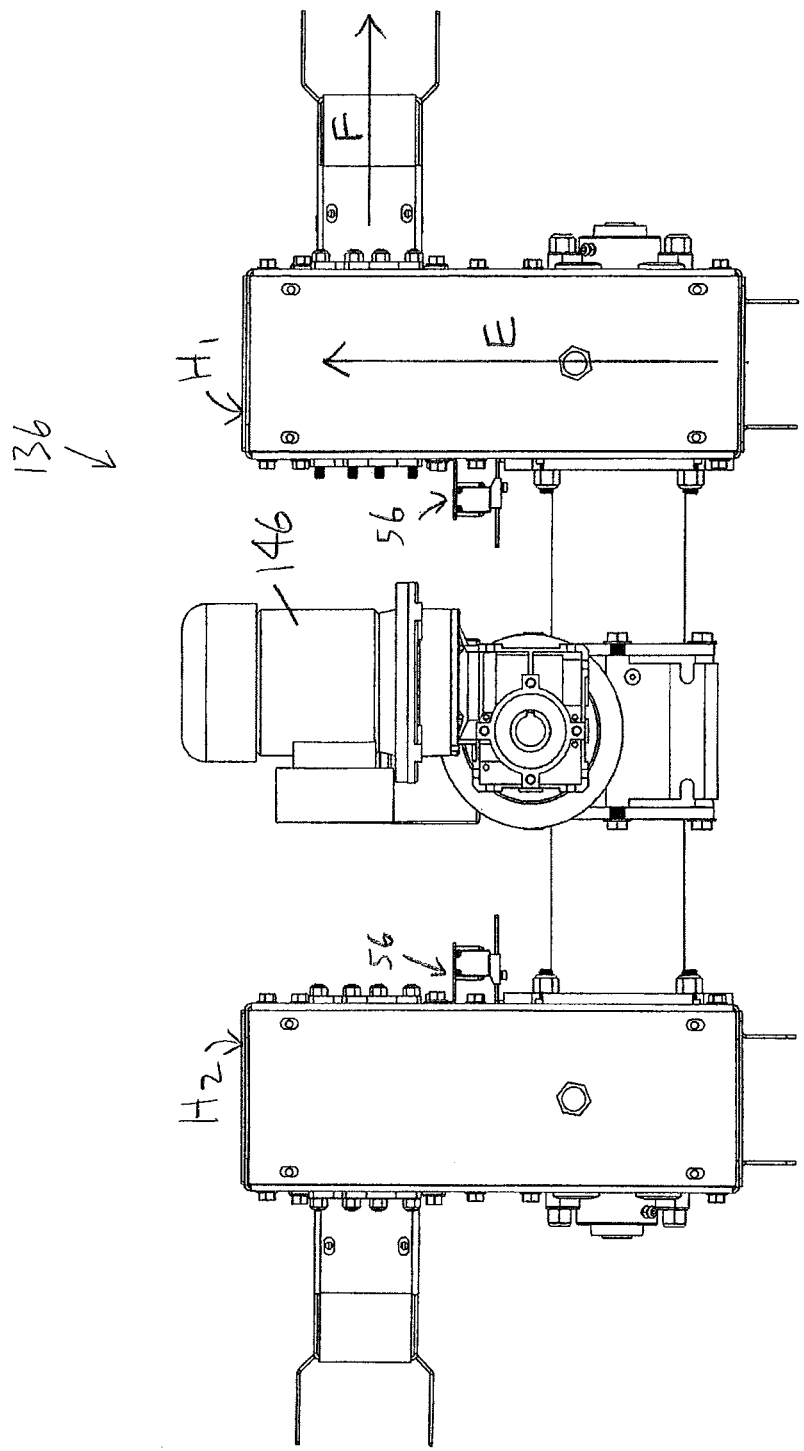
FIG. 10B is a top view of the drive subassembly of FIG. 10A, drawn at a larger scale.
Figure 10C:
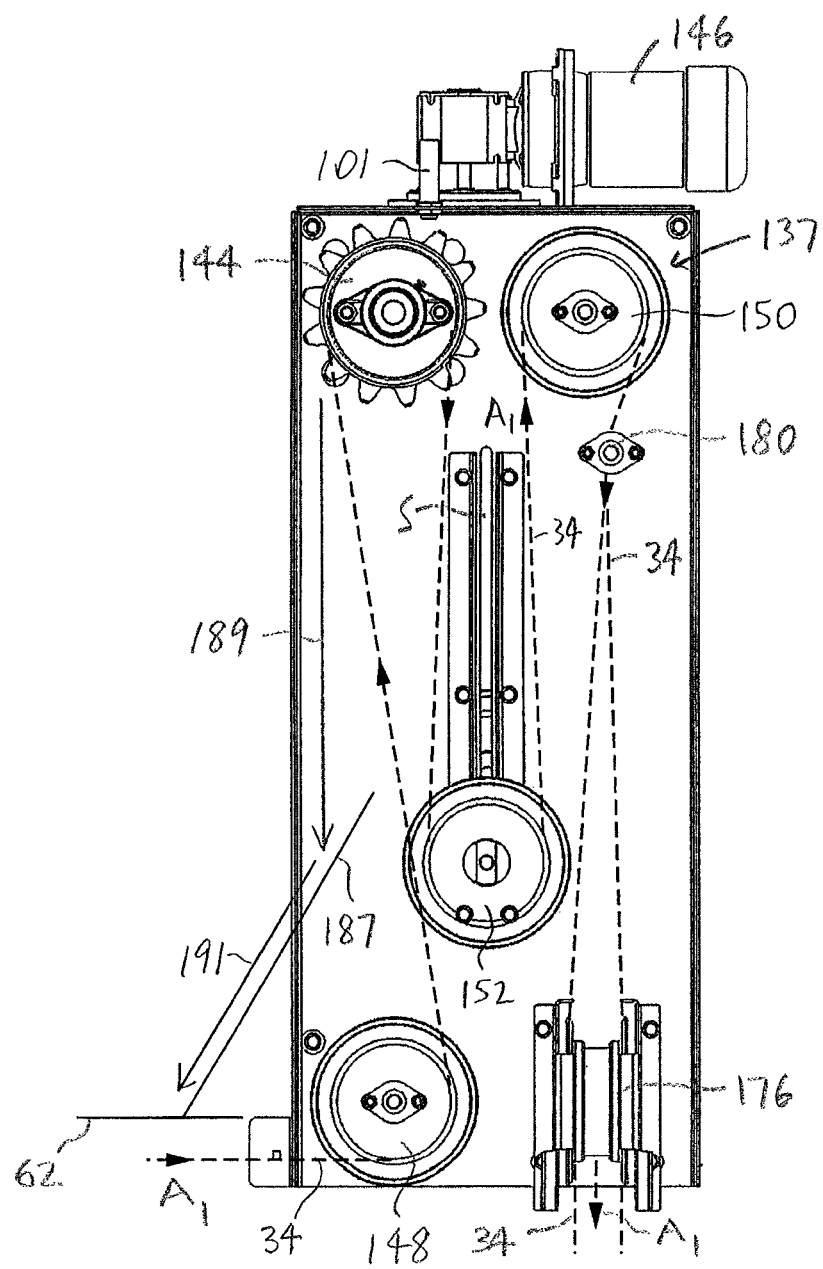
FIG. 10C is a side view of certain elements of the drive subassembly of FIGS. 10A and 10B, including a schematic illustration of the chain moving therethrough, with a side cover removed.
Figure 10D:
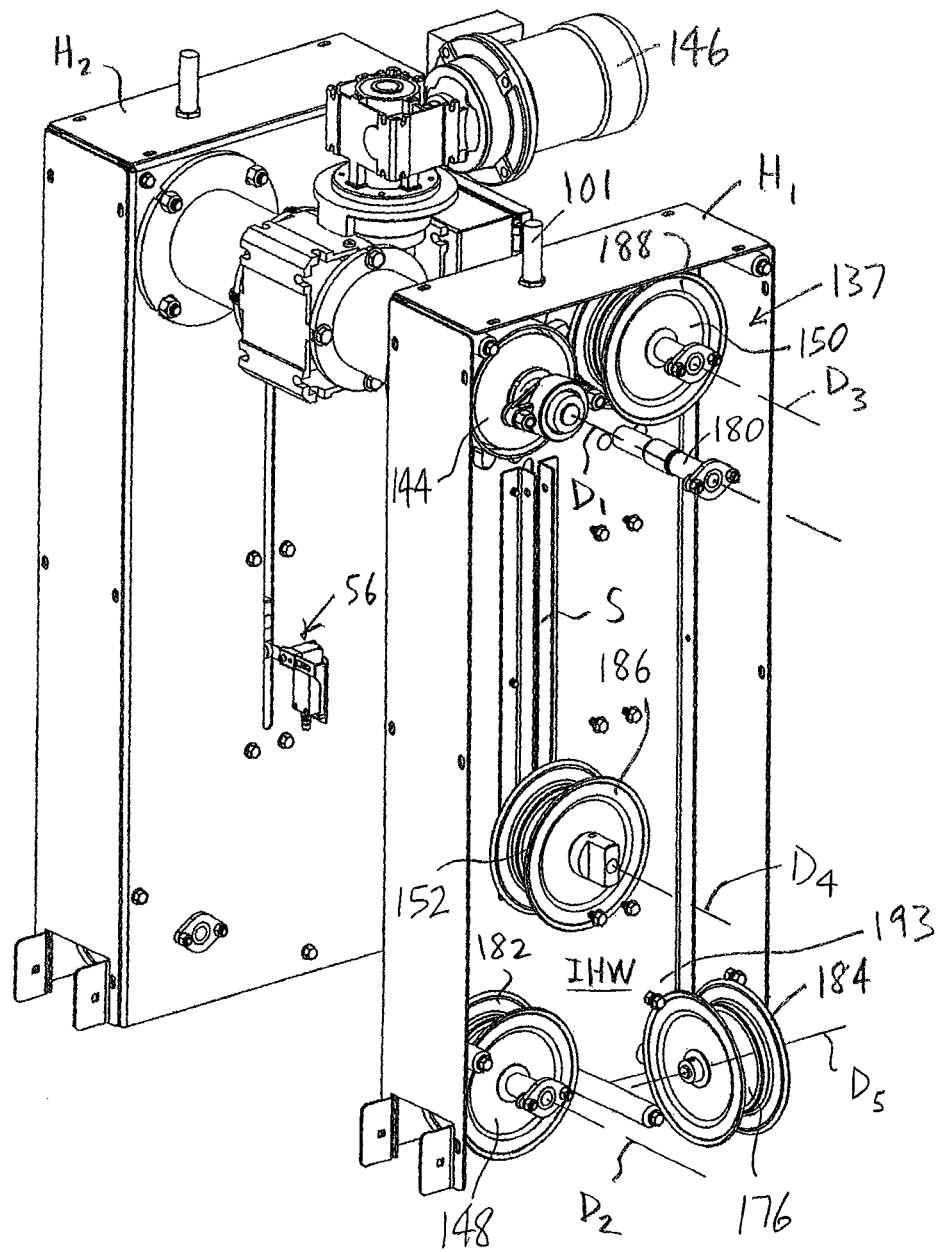
FIG. 10D is another isometric view of certain elements of the drive subassembly of FIGS. 10A and 10B.
Figure 10E:
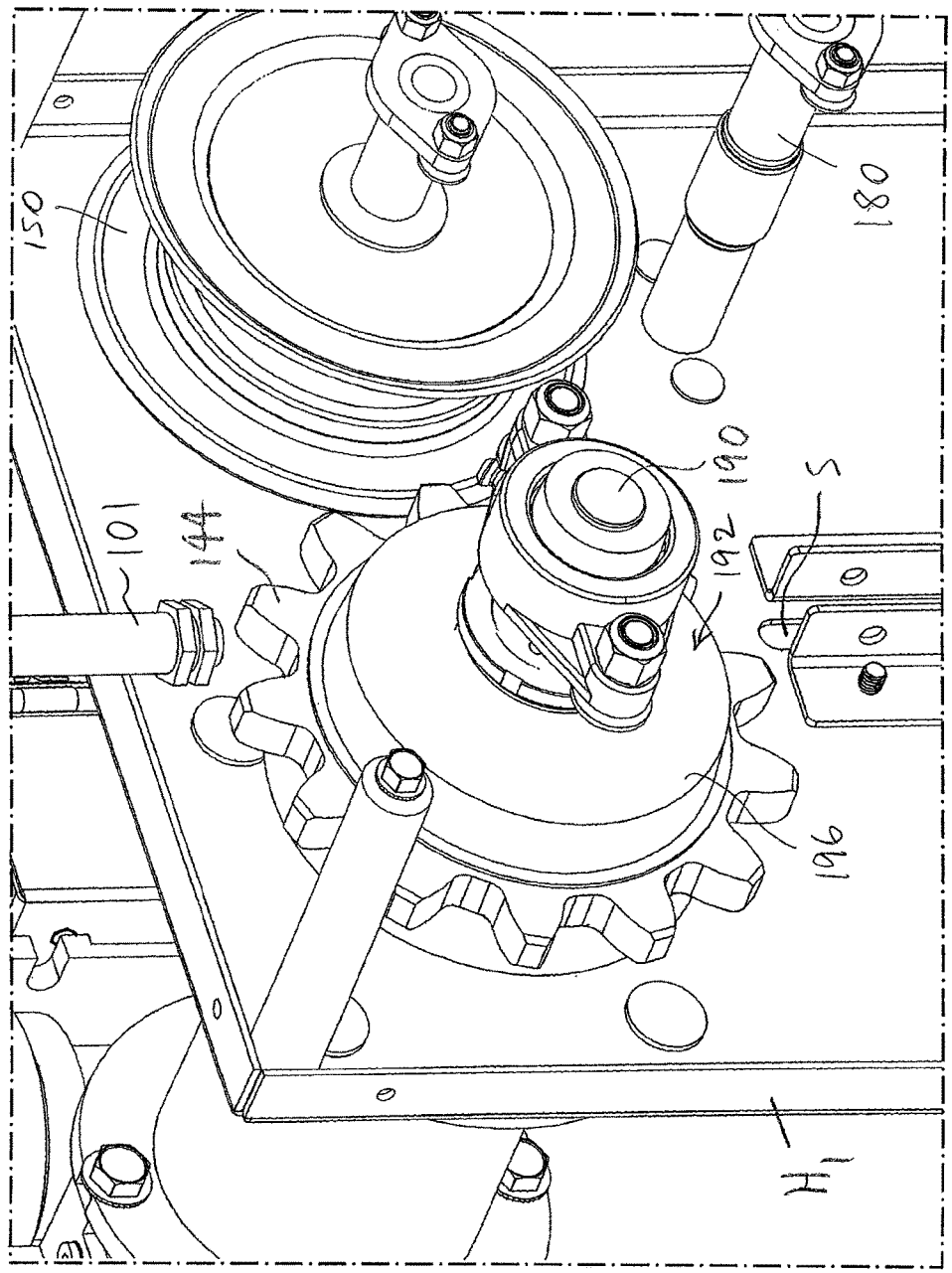
FIG. 10E is an isometric view of an embodiment of a sprocket and a slip clutch subassembly of the invention, drawn at a larger scale.
Figure 10F:
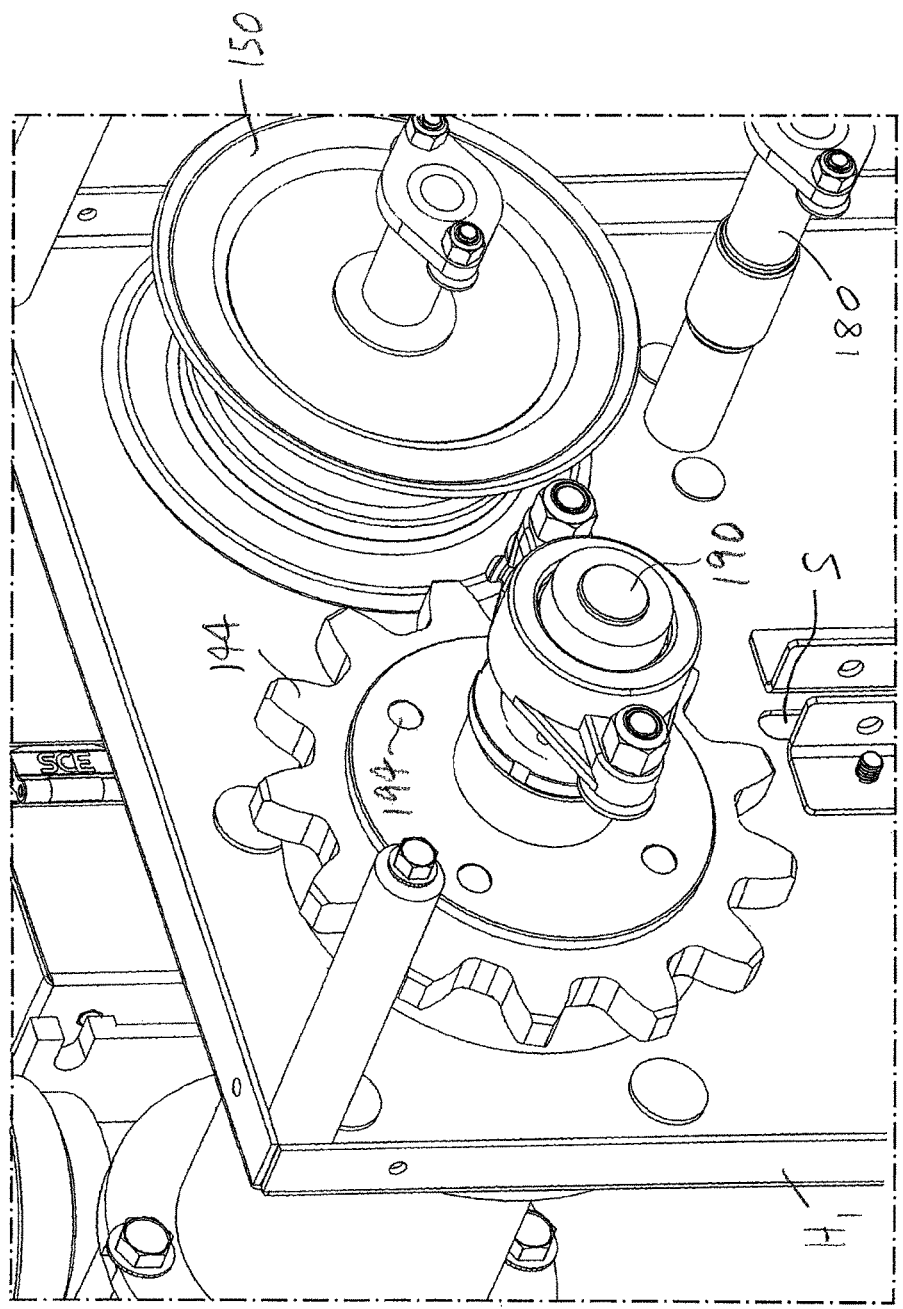
FIG. 10F is an isometric view of an embodiment of a sprocket of FIG. 10E.
Figure 10G:
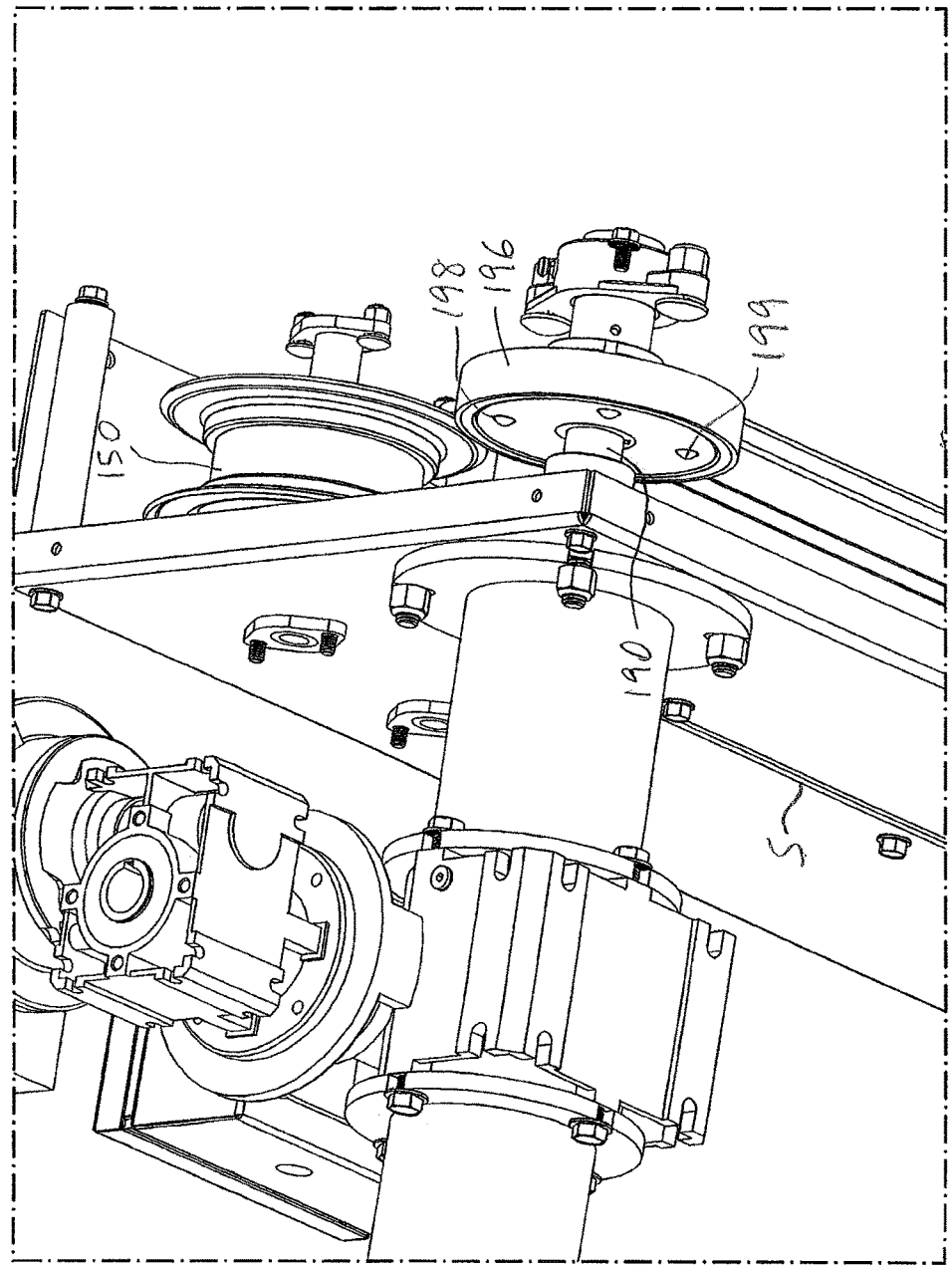
FIG. 10G is an isometric view of an embodiment of a clutch plate in the slip clutch subassembly of FIG. 10E, with engagement elements that fit within detents in the sprocket and the clutch plate.
Figure 10H:
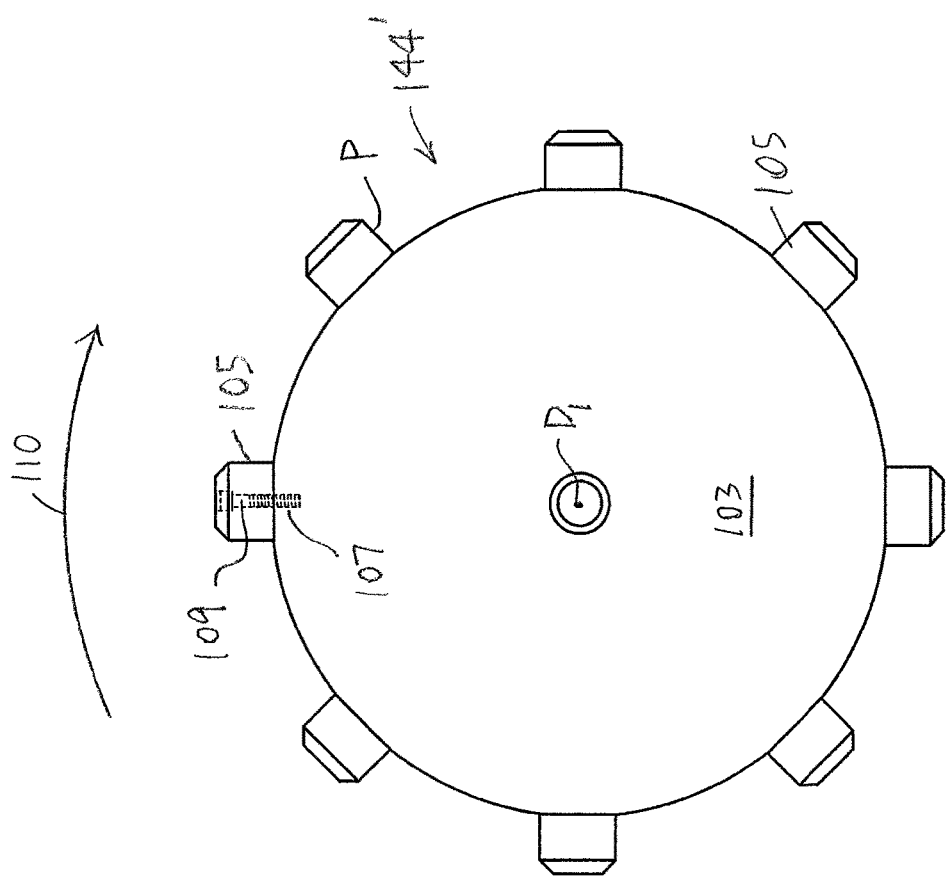
FIG. 10H is a side view of an alternative embodiment of the sprocket of the invention, drawn at a smaller scale.
Figure 11:
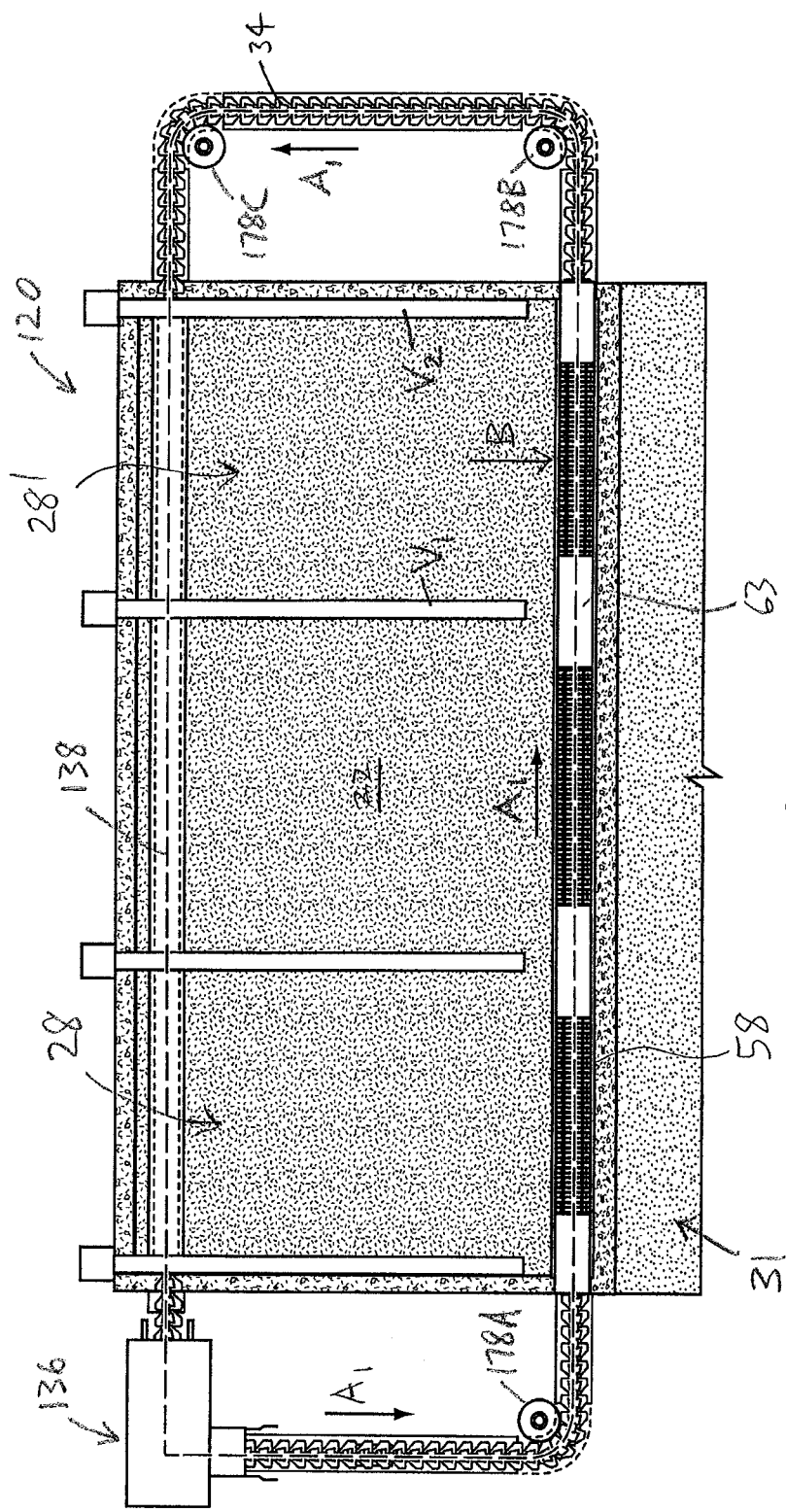
FIG. 11 is a top view of an alternative embodiment of the system of the invention, drawn at a smaller scale.

In another embodiment of the system 120 of the invention, illustrated in FIGS. 9-11, the guide subassembly 142 preferably includes only three corner wheel subassemblies identified in FIG. 11 for convenience as 178A-178C respectively. It is advantageous to have only three corner wheel subassemblies, rather than four, because of the reduction in costs that results.

As can be seen in FIG. 11, the system 120 preferably includes the transportation element 34 positioned on a predetermined path 138. The transportation element's direction of travel on the predetermined path 138 is indicated by arrow "$A_1$" in FIG. 11.

In one embodiment, the system 120 preferably includes an alternative embodiment of the drive subassembly 136, illustrated in FIGS. 9-11. Preferably, the drive subassembly 136 includes the motor 146 and a drive train 137 operatively connected to the motor 146. In FIGS. 10C-10G, parts of a housing "$H_1$" normally covering the drive train 137 are omitted for clarity of illustration. As can be seen in FIGS. 10A and 10B, in one embodiment, it is preferred that a second drive train (inside the housing "$H_2$") is also operatively connected with the motor. However, in order to simplify the description, only the drive subassembly 136 and the drive train 137 thereof are described, it being understood that the drive trains (of the drive subassembly 136) are mirror images of each other.

The drive subassembly 136 is a dual drive, i.e., one motor 146 is used to drive two drive trains. This is advantageous where two rows of stalls are located parallel to each other, and side by side, as illustrated in FIG. 9. It will be understood that the drive subassembly 136 may alternatively include only one drive train 137 driven by the motor 146.

As can be seen in FIGS. 10C and 10D, the drive train 137 preferably includes a sprocket 144, first and second idler wheels 148, 150, a floating idler wheel 152 positioned on the predetermined path 138 between the sprocket 144 and the second idler wheel 150, and an exit idler wheel 176. As can be seen in FIGS. 10C-10D, it is preferred that the exit idler wheel 176 is positioned for engagement with the transportation element 34 after the second idler wheel 156, for guiding the transportation element 34 on the predetermined path 138. That is, the exit idler wheel 176 preferably is positioned downstream in relation to the second idler wheel 156.

Figure 1G:
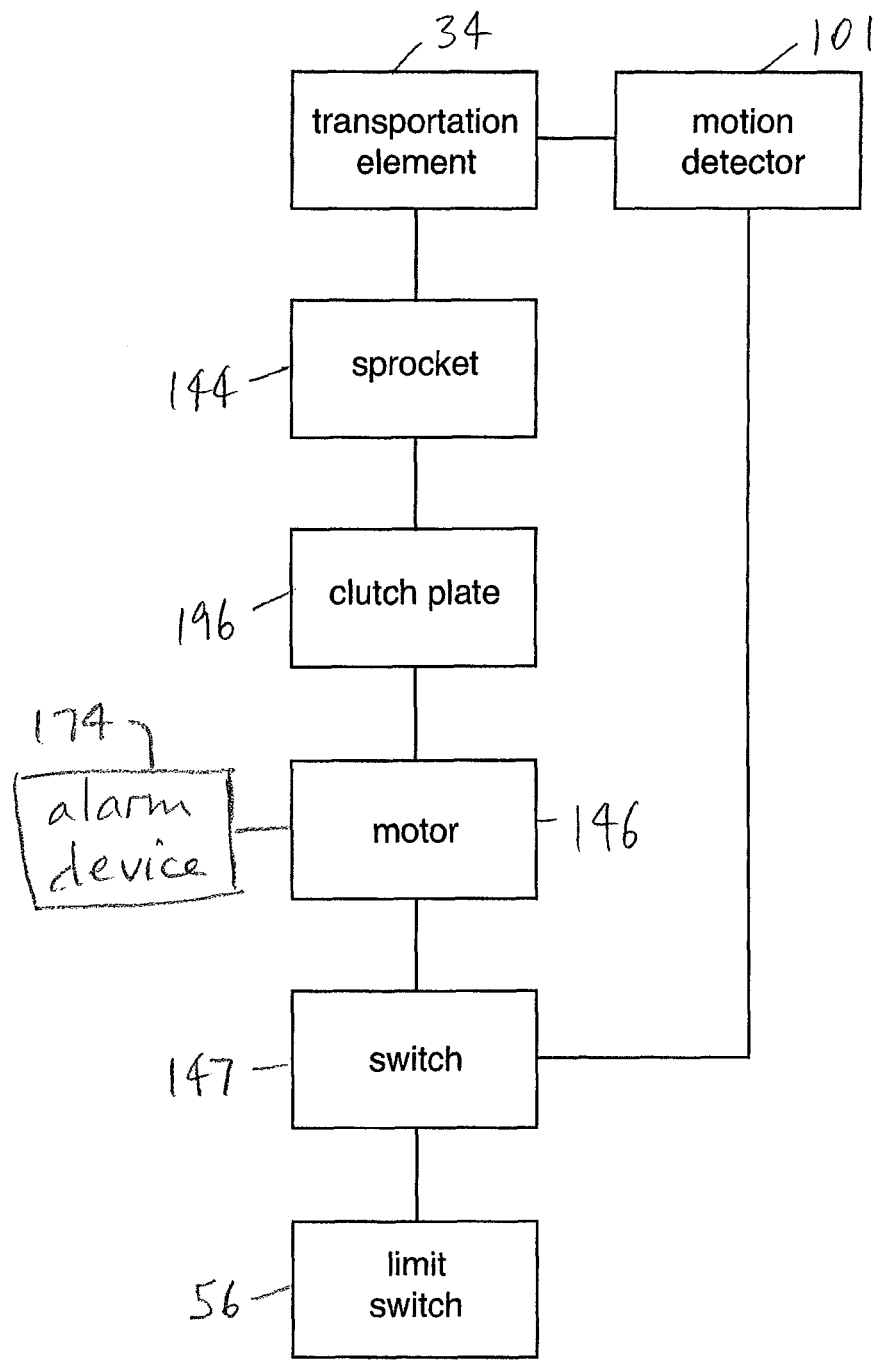
FIG. 1G is a block diagram schematically illustrating the connection of a motion detector and the switch of the motor in an alternative embodiment of the drive subassembly of the invention.

It will be understood that, as schematically illustrated in FIG. 1G, and as shown in FIG. 10B, the drive train 137 includes the limit switch 56. The floating idler wheel 152 is engaged with and supported by the transportation element 34, and moves substantially vertically in the slot "S" in response to variations in the tension to which the transportation element 34 is subjected. As can be seen in FIGS. 10B and 10D, for example, the limit switch 56 that is included in the second drive train is mounted on the second housing "$H_2$".

Preferably, the sprocket 144 and the first and second idler wheels 148, 150 and the floating idler wheel 152 are rotatable about respective axes "$D_1$", "$D_2$", "$D_3$", and "$D_4$" thereof. It is also preferred that the first and second idler wheels 148, 150 are substantially aligned with a first direction (indicated by arrow "E" in FIG. 10B). The exit idler wheel 176 is rotatable about an exit idler axis "$D_5$" (FIGS. 10C, 10D). The exit idler wheel 176 is substantially aligned with a second direction (indicated by arrow "F" in FIG. 10B) that is substantially orthogonal to the first direction.

In one embodiment, the drive subassembly 136 preferably additionally includes a guide bearing element 180 positioned to guide the transportation element 34 from the second idler wheel 150 to the exit idler wheel 176. As can be seen in FIGS. 10C and 10D, the guide bearing element 180 preferably is located on the predetermined path 138 and is positioned between the second idler wheel 150 and the exit idler wheel 176. Because the exit idler wheel's axis "$D_5$" is orthogonal to the axes "$D_1$"-"$D_4$", the transportation element 34 is twisted approximately 90° as the transportation element 34 moves from engagement with the second idler wheel 150 to engagement with the exit idler wheel 176.

As noted above, this 90° turn in the predetermined path 138 that is effected by the drive train 137 has the benefit that one less corner wheel subassembly is needed, thereby reducing costs. In addition, positioning the drive subassembly 136 at a corner has the advantage that the drive subassembly 136 so located is less obtrusive (i.e., with respect to the stalls) than it may be if positioned in other locations.

As can be seen in FIG. 10C, in moving from engagement with the first idler wheel 148 to engagement with the sprocket 144, the transportation element 34 is following a path generally upwardly, at more than 90° to the horizontal. That is, the transportation element 34, in moving between the first idler wheel 148 and the sprocket 144, is turned upside down, to an extent. This has the benefit of tending to remove sand that remains on the transportation element 34 after the transportation element's engagement with the first idler wheel 148. It will be understood that, in practice, it is likely that if any sand is on the transportation element 34 at that point, then it would be wet.

In one embodiment, in order to deflect sand that falls off the transportation element between the first idler wheel 148 and the sprocket, the drive train 137 preferably includes a shield 187. As can be seen in FIG. 10C, the sand that falls onto the shield 187 (schematically illustrated by arrow 189 in FIG. 10C) is directed thereby onto the upper trough 62 (as schematically illustrated by arrow 191 in FIG. 10C). It has been found that the sand moved onto the upper trough 62 generally falls off it, onto the upper end 30. For clarity of illustration, the shield 187 is omitted from FIG. 10D. It will be understood that in order to accommodate the shield 187, the housing "$H_1$" preferably includes an aperture (not shown in FIG. 10D).

The guide bearing element 180 is used to align the transportation element 34 with the exit idler wheel 176.

It has been found that, if any sand still remains on the transportation element 34 after it has engaged the second idler wheel 150, then such sand is removed by the 90° twist to which the transportation element 34 is subjected between the second idler wheel 150 and the exit idler wheel 176. Any such sand would be wet. In practice, it has been found that little sand remains on the transportation element 34 after engagement with the second idler wheel 150.

The sand that falls off the transportation element 34 between the second idler wheel 150 and the exit idler wheel 176 accumulates in a gap 193 between the exit idler wheel 176 and the inner housing wall "IHW" (FIG. 10D). If sufficient sand accumulates, the transportation element 34 picks it up and moves the sand along the predetermined path 138, to be dropped therefrom at the upper end. Accordingly, due to the arrangement of the idler wheels and the sprocket in the drive train 137, the drive train 137 is self-cleaning.

In one embodiment, the first idler wheel 148 and the exit idler wheel 176 each include flanges 182, 184 respectively (FIG. 10D) for substantially aligning the transportation element 34 with the first and second directions respectively upon engagement of the transportation element 34 with each of the first idler wheel 148 and the exit idler wheel 176 respectively.

As can be seen in FIG. 10D, it is also preferred that the floating idler wheel 152 and the second idler wheel 150 include respective flanges 186, 188. It has been found that the flanges on all of the first and second idler wheels 148, 150, the exit idler wheel 176, and the floating idler wheel 152 tend to maintain the transportation element 34 on the predetermined path 138 as the transportation element 34 is engaged by the drive train 137. In particular, the flanges appear to hold the transportation element on the wheel 148, 150, 176, 152 notwithstanding the tendency of the transportation element 34 to twist as it engages the elements in the drive train 137.

The transportation element or chain 34 may have a length of approximately 350 feet (approximately 107 m), or more. As described above, the floating idler wheel performs a self-tensioning function. Those skilled in the art would appreciate that the length of the slot "S" (i.e., the extent of vertical travel of the floating idler wheel that is possible) affects the extent to which the floating idler wheel can affect the tension to which the transportation element 34 is subjected. It has been found that a relatively longer slot "S" can be advantageous in this regard. For instance, in one embodiment, the slot "S" preferred is approximately 18 inches (approximately 45.72 cm) long. It will be understood that the drive subassembly 136 preferably includes limit switches 56, i.e., one for each drive train (FIG. 1G).

In one embodiment, the motor 146 includes a rotatable output shaft 190 thereof (FIG. 10G), through which the motor 146 is connectable with the sprocket 144. It is also preferred that the drive subassembly 136 additionally includes a slip clutch subassembly 192 for releasably connecting the sprocket 144 with the rotatable output drive shaft 190 of the motor 146. Preferably, the clutch subassembly 192 is configured to rotate the sprocket 144 at the same speed as the output drive shaft 190 when movement of the transportation element 34 by the sprocket 144 is unimpeded, and to permit the output drive shaft 190 and the sprocket 144 to rotate at different speeds respectively, when movement of the transportation element movement is impeded. It will be understood that, for the purposes hereof, the rotation speed of the sprocket 144 includes a speed of zero.

Those skilled in the art would appreciate that the slip clutch subassembly 192 may be configured in various ways, and may include various elements. In one embodiment, the sprocket 144 preferably includes a number of first detents 194 (FIG. 10F). The slip clutch subassembly 192 preferably includes a clutch plate 196 mounted to the output drive shaft 190. The clutch plate 196 includes second detents 198 alignable with the first detents 194 respectively. Preferably, the slip clutch subassembly 192 also includes a number of intermediate elements 199 partially receivable respectively in the first and second detents, when the respective first and second detents 194, 196 are aligned. It is preferred that each intermediate element 199 is secured in a selected one of the first detents. (Those skilled in the art would appreciate that, alternatively, the intermediate elements 199 may be secured in the second detents.) The intermediate elements 199 preferably permit the clutch plate 196 and the sprocket 144 to rotate at different speeds respectively when movement of the transportation element 34 is impeded so that the sprocket 144 rotates at a sprocket rotation speed that is less than a rotation speed of the clutch plate 196.

It will be understood that, when the first and second detents 194, 198 are aligned, each of the intermediate elements 199 is positioned, in part, in one of the first detents and an aligned one of the second detents. It will also be understood that the side of the clutch plate 196 that includes the second detents is positioned proximal to the side of the sprocket 144 that includes the first detents, and the clutch plate 196 is urged toward the sprocket 144 by urging means (not shown), so that the intermediate elements 199 are securely held therebetween. When the sprocket 144 and the clutch plate 196 are secured to each other by the intermediate elements 199, which are positioned in the first and second detents 194, 198, and movement of the transportation element 34 is unimpeded, the sprocket 144 and the clutch plate 196 are secured together and rotate together, at the same speed and about the same axis. However, when the transportation element 34 encounters one or more significant impediments, its movement is slowed, or it stops. As a result, the rotation of the sprocket 144 also slows, or stops. However, while the motor 146 is energized, the shaft 190 continues to rotate at its normal operating rotational speed, and the clutch plate 196 therefore also continues to rotate, at the same speed.

Due to the difference in the rotational speeds of the sprocket 144 and the clutch plate 196 at that point, the intermediate elements 199 are subjected to torque, which urges each of the intermediate elements 199 out of one or both of the first and second detents in which it was positioned. Upon sufficient torque being applied thereto, each of the intermediate elements 199 is forced out of the second detents, permitting slippage (i.e., rotational movement of the sprocket 144 and the clutch plate 196 about the axis "$D_1$" relative to each other). This slippage releases tension in the transportation element 34 upstream relative to the sprocket 144.

It will be understood that, when the slippage takes place, the intermediate elements are respectively removed from the detents in which they are not secured, permitting rotation of the clutch plate 196 relative to the sprocket 144. For instance, if the intermediate elements 199 are secured in the second detents, then upon slippage taking place, the intermediate elements 199 are respectively removed from the first detents in which they had been located, and (while still held in the second detents respectively) rotationally moved about the axis "$D_1$" to the next first detent, in which part of the intermediate element 199 is then received.

In one embodiment, the conveyor system 120 preferably includes a motion detector 101 (FIG. 10D) configured for transmitting a stop signal to the motor switch 147 (FIG. 1G) to de-energize the motor 146 upon the motion detector 101 detecting that the transportation element 34 is stationary relative to the motion detector 101 over a preselected time period. The motion detector 101 and the slip clutch, working together as described above, release any tension that may build up in the transportation element 34 upstream relative to the sprocket 144 when movement of the transportation element 34 is impeded to the extent that such movement stops.

From the foregoing, it can be seen that, because of the motion detector 101 and the slip clutch subassembly 192, the system 120 may operate more safely. Those skilled in the art would appreciate that, in the absence of the motion detector 101 and the slip clutch subassembly 192, when the transportation element 34 is stopped, the part of the transportation element 34 that is upstream relative to the sprocket 144 would be subjected to significant tension. In practice, this tension may be dangerous to the operator, because it may be released suddenly when an obstruction or impediment is removed. Those skilled in the art would appreciate that, in order to remove an obstruction or impediment to the transportation element 34, the operator may be required to use his fingers to remove a stone or other object from a small space in which it is wedged, e.g., between the transportation element 34 and the inner side of a trough wall.

In one embodiment the drive subassembly 136 preferably also includes an alarm device 174 (FIG. 1G) for providing a signal when the motor 146 is de-energized upon the motion detector 101 transmitting the stop signal to the motor switch 147. As described above, the alarm device 174 preferably is adapted to produce appropriate audible or visual signals, or both. For instance, the alarm device 174 may be configured to transmit a suitable text or e-mail message to a mobile device so that the operator may be alerted, regardless of the operator's position.

As noted above, the drive subassembly 136 preferably also includes the limit switches 56 (i.e., one for each drive train, where the drive subassembly is a dual drive unit). The alarm device 174 preferably also produces an appropriate alarm signal upon the motor 146 being de-energized due to activation of one of the limit switches 56.

An alternative embodiment of the sprocket 144' of the invention is illustrated in FIG. 10H. It is preferred that the sprocket 144' includes a sprocket body 103 rotatable about the sprocket axis "$D_1$" and a number of teeth elements 105 releasably securable to the sprocket body 103, for engagement with the transportation element 34. It is preferred that each tooth element 105 has four sides, and is square in plan view. It will be understood that the teeth elements 105 may be secured to the sprocket body 103 using any suitable means. In one embodiment, for instance, the sprocket body 103 preferably includes threaded holes 107 in which machine screws 109 are threadably receivable (FIG. 10H). For clarity of illustration, only one threaded hole and screw are shown in FIG. 10H, it being understood that each tooth element 105 is secured to the body 103 in the same way. This embodiment of the sprocket 144' is advantageous for two reasons. First, because the teeth elements 105 are separable from the sprocket body 103, the teeth elements 105 can be hardened, without the body 103 also being hardened. This means that the sprocket is produced at lower overall cost.

Second, the teeth elements 105 may be loosened, and rotated, so that faces thereof that are less worn may be positioned for engagement with the chain. In this way, the teeth elements of the sprocket 144' may last longer than the teeth of a unitary sprocket. In FIG. 10H, the direction of rotation of the sprocket 144' about its axis is indicated by arrow 110. It can be seen in FIG. 10H that the front face "P" of each tooth element 105 would be subjected to more wear than other faces of the tooth element 105. Accordingly, when the faces that are facing frontwardly (i.e., in the direction indicated by arrow 110) are worn, the tooth elements 105 preferably are repositioned so that another, non-worn, face "P" is facing frontwardly. This can be repeated until all four faces of each tooth element 105 are worn.

Figure 2A:
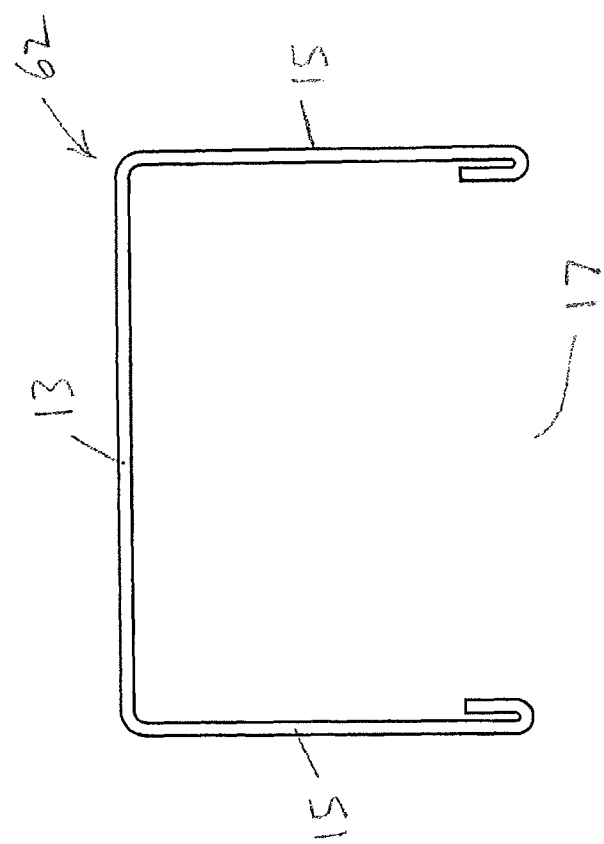
FIG. 2A is an end view of an embodiment of an upper trough of the invention, drawn at a smaller scale.

In one embodiment, the upper trough 62 preferably is positioned at the upper end 30 of the enclosure region 26 through which the transportation element 34 is movable. The upper trough 62 preferably is aligned with an upper part 11 of the predetermined path 38. As can be seen in FIGS. 1D and 2A, the upper trough 62 preferably includes a top portion 13 and one or more side portions 15 connected to the top portion 13 and at least partially defining one or more openings 17 in the upper trough 62 through which the sand 22 is permitted to fall from the transportation element 34 to the upper end 30 of the enclosure region 26.

For safe operation, the transportation element 34 is generally covered while the system operates. It will be understood that the main function of the upper trough 62 is to cover the transportation element 34, so that it is not exposed when the system is operating. It will also be understood that, in the parts of the predetermined path 38 located between the lower trough and the upper trough, the transportation element 34 preferably is covered by a suitable elongate cover (not shown), for safety. The pulleys 73 in the corner wheel subassemblies 78 preferably are also covered when in use, as can be seen, for example, in FIG. 4A.

Figure 2B:
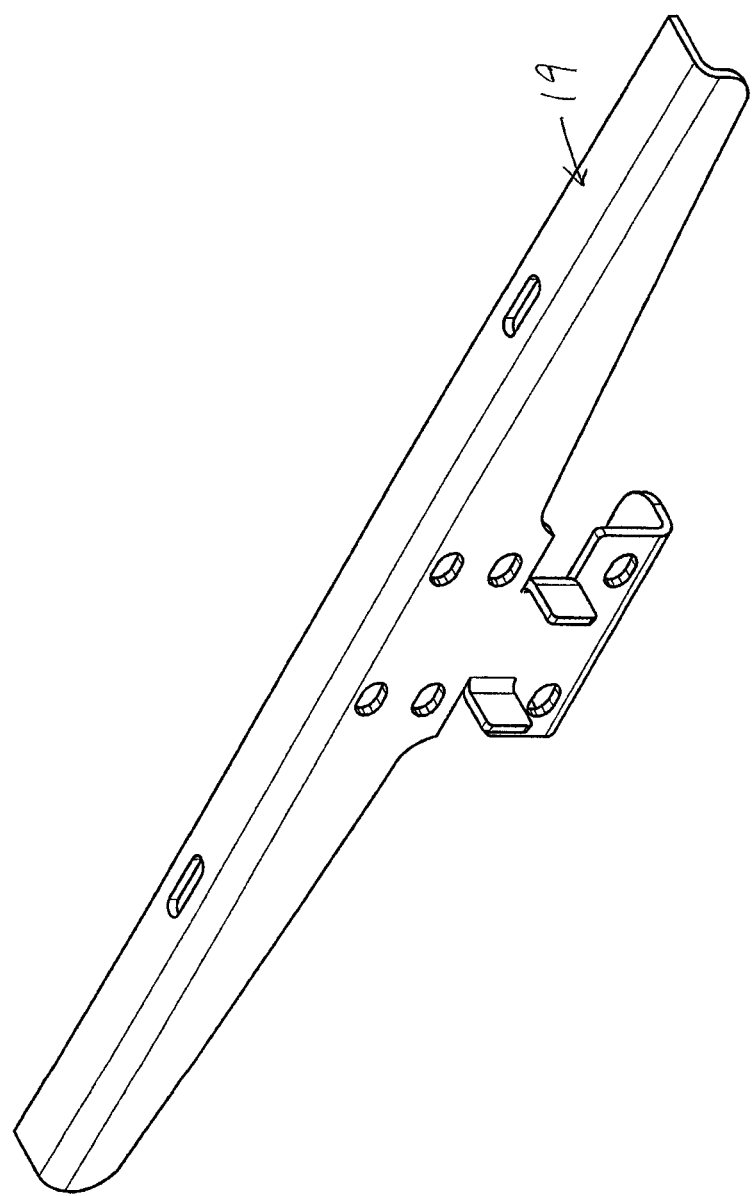
FIG. 2B is an isometric view of an embodiment of an upper trough support bracket of the invention.
Figure 2C:
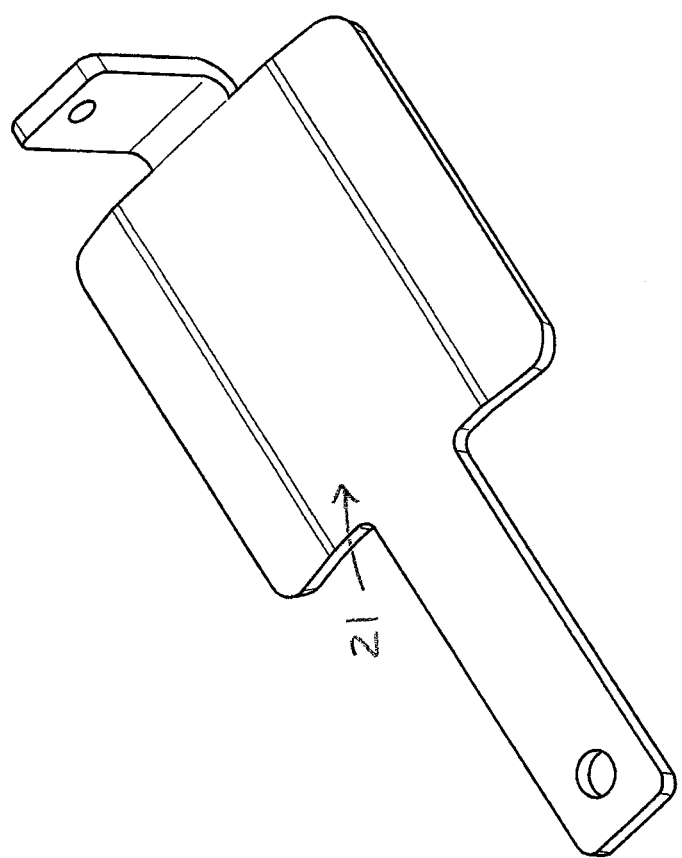
FIG. 2C is an isometric view of an embodiment of a wear bar of the invention, drawn at a larger scale.
Figure 2D:
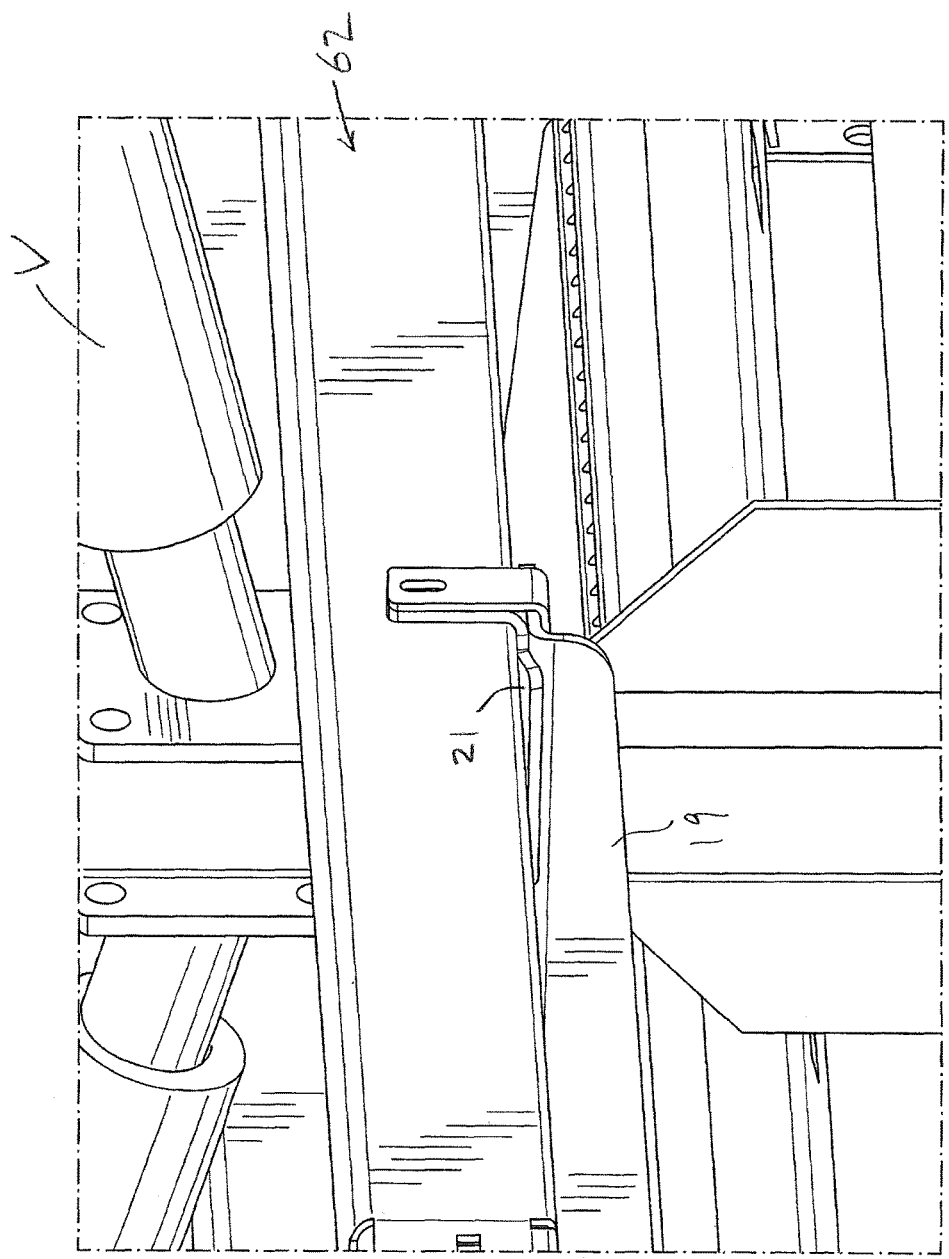
FIG. 2D is an isometric view of the upper trough of FIG. 2A mounted on the upper trough support bracket of FIG. 2B, drawn at a smaller scale.

As can be seen in FIGS. 1D and 2D, in one embodiment, the upper trough 62 preferably is at least partially supported by one or more upper trough brackets 19. Those skilled in the art would appreciate that the upper trough brackets 19 are secured to a suitable foundation and/or to suitable posts, as the case may be. An embodiment of the upper trough bracket 19 of the invention is illustrated in FIG. 2B. Preferably, the upper trough brackets 19 are spaced apart from each other along the upper trough 62 at suitable intervals. It is also preferred that the system 20 includes a wear bar 21 positioned to at least partially support the upper trough 62, the wear bar 21 being formed to resist wear thereof (FIGS. 2C, 2E). As can be seen, for example, in FIGS. 1D and 2D, it is preferred that the wear bar 21 is positioned on the upper trough bracket 19 to protect the support bracket from wear. The wear bar 21 preferably is positioned between the transportation element 34 and the upper trough bracket 19, as can be seen in FIGS. 1D and 2E. (It will be understood that the upper trough bracket 19 is omitted from FIG. 2E for clarity of illustration.)

Those skilled in the art would appreciate that, to the extent that any of the sand remains on the transportation element 34 as it is engaged by the drive subassembly 36, 136, such sand may cause operational problems. In particular, sand adhering to the transportation element 34 may accumulate inside the housing (FIGS. 1A, 5B, 10A, 10B) of the drive subassembly 36, 136. The sand may accumulate to the extent that it interferes with the operation of the drive subassembly 36, 136.

It has been found that, in general, the sand does not adhere to the transportation element 34 to a significant extent unless the moisture content thereof is relatively high. However, if the sand is somewhat damp, it tends to adhere together and also to adhere to the transportation element 34. When the moisture content is relatively high, the sand may tend to remain on the transportation element 34 as it is moved through the upper trough 62.

Figure 3A:
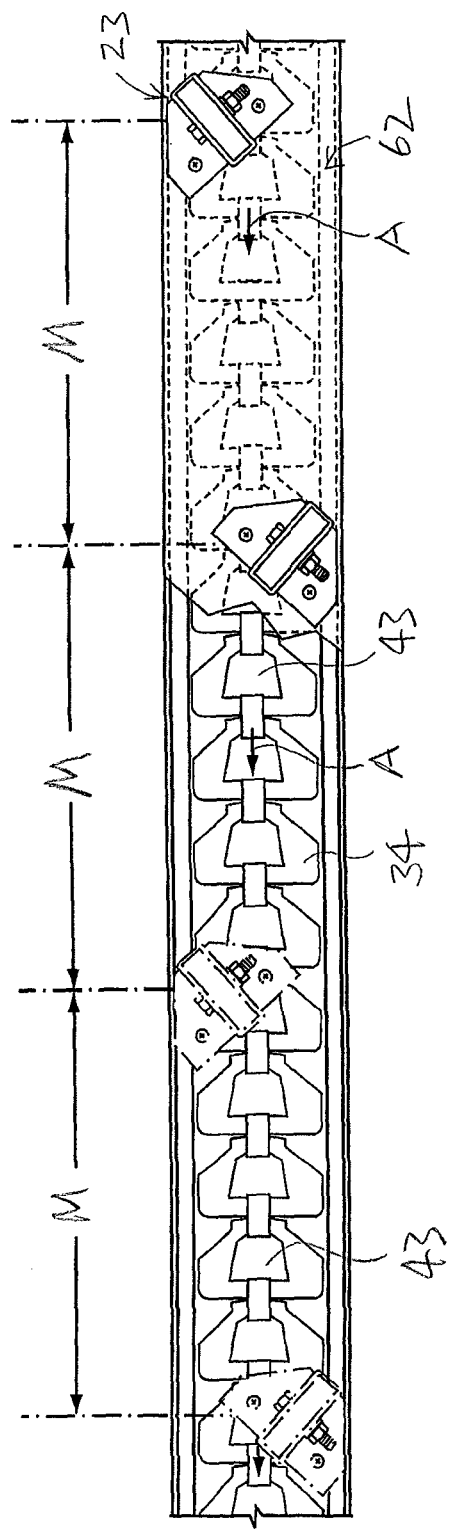
FIG. 3A is a top view of the part of the transportation element in the upper trough, with sand removal subassemblies mounted on the upper trough, drawn at a smaller scale.
Figure 3B:
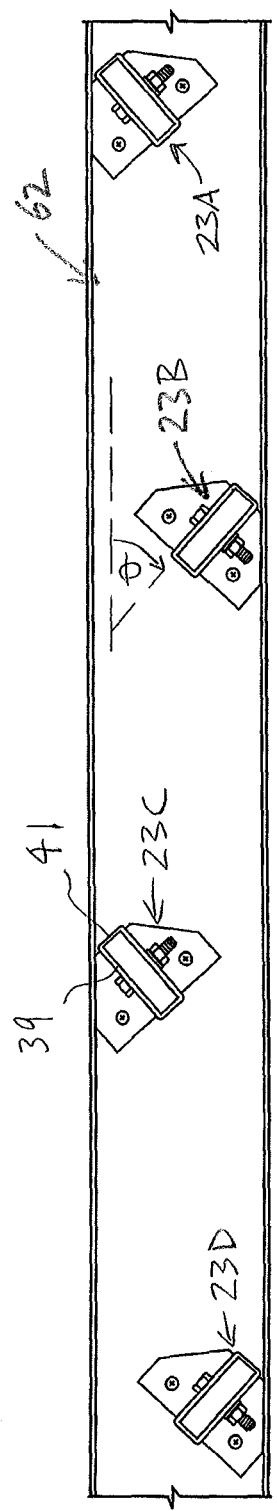
FIG. 3B is a top view of the upper trough with the sand removal subassemblies mounted thereon.
Figure 3C:
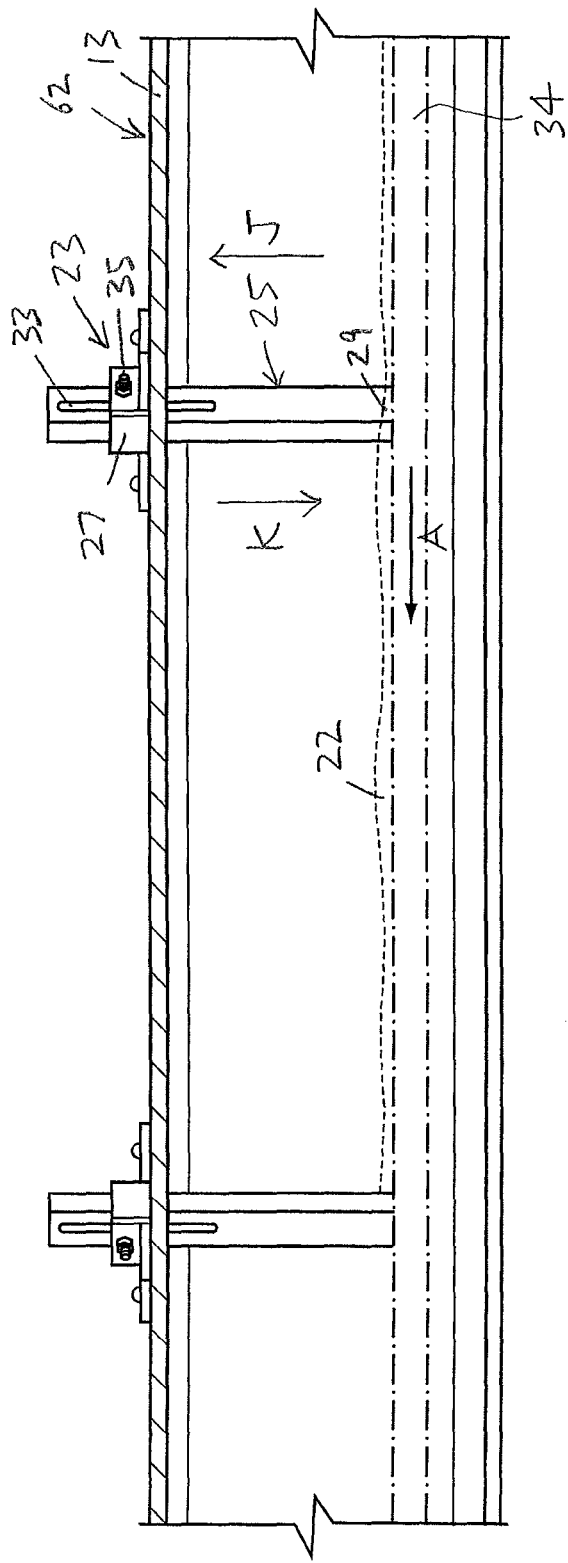
FIG. 3C is a longitudinal section of the upper trough with the sand removal subassemblies mounted thereon.

Accordingly, in one embodiment, the conveyor system 20 preferably includes one or more sand removal subassemblies 23, illustrated in FIGS. 3A-3C. As will be described, the sand removal subassemblies 23 preferably are mounted in the upper trough 62. Preferably, the sand removal subassemblies are generally located downstream in the upper trough, and positioned at intervals along the upper trough, so that sand moved off the transportation element 34 by the sand removal subassemblies is distributed along the upper ends of the stalls. In one embodiment, each of the sand removal subassemblies 23 preferably includes a removal element 25 for moving the sand 22 off the transportation element 34 as the transportation element 34 moves relative to the removal element 25. It is also preferred that the sand removal subassembly 23 includes a mounting bracket 27 for permitting substantially vertical movement of the removal element 25 relative to the transportation element 34, in response to engagement thereof by the sand on the transportation element 34.

In FIG. 3B, a number of sand removal subassemblies are shown mounted to the top portion 13 of the upper trough 62. For convenience, the four sand removal subassemblies illustrated in FIG. 3B are identified by reference numerals 23A-23D respectively. As can be seen in FIG. 3C, it is preferred that the mounting bracket 27 of each of the subassemblies 23A-23D is secured to the top portion 13, and that the removal element 25 is slidably or movably mounted in the bracket 27, to permit the removal element 25 to move in the substantially vertical directions indicated by arrows "J" and "K" in FIG. 3C so that a lower end 29 of the removal element 25 may rest on the transportation element 34. Preferably, the bracket 27 permits the removal element 25 to be urged downwardly by gravity. The removal element 25 preferably includes a slot or aperture 33 in which a bolt or other suitable fastening means 35 of the mounting bracket 27 is positionable (FIG. 3C). Preferably, the fastening means 35 permits substantially vertical movement of the removal element 25 relative to the transportation element 34, as described above, in response to the sand when the sand engages it. It will be understood that the lower end 29 of the removal element 25 preferably rests on the transportation element 34 in the absence of the sand, due to gravity. As shown in FIG. 3C, when the system 20 is operating, the transportation element 34 moves in the direction indicated by arrow "A", and if the sand has a relatively high moisture content, the transportation element 34 carries a layer of the sand 22, which is dislodged by the removal element 25.

The removal element 25 may have any suitable shape, and it may be made of any suitable material. Preferably, the removal element 25 is in the form of a substantially rectangular block, and is made of polyethylene. Each removal element 25 preferably has a long side 39 and a short side 41 (FIG. 3B). As can be seen in FIG. 3A, in one embodiment, each removal element 25 preferably is positioned with its long side 39 at a preselected angle relative to the direction of travel. (In FIGS. 3A and 3C, the direction of travel of the transportation element 34 is indicated by arrow "A".) For instance, it has been found that the removal element 25 may be positioned with its long side 39 at approximately 45° to the transportation element's direction of travel.

As can also be seen in FIGS. 3A and 3C, the removal elements 25 preferably are sized and positioned to engage sand over approximately half of the width of the transportation element 34. The sand removal subassemblies 23 preferably are separated from each other respectively along the length of the upper trough 62 by a distance "M" (FIG. 3A), and the positions of the respective engagement elements preferably also alternate, from one side to the other, to direct the sand to center holes 43 of the transportation element 34.

It has been found that a device (e.g., the removal element) used to guide or otherwise move the sand off the transportation element preferably is configured to move to accommodate the sand, when it is engaged by the sand. Accordingly, the removal elements 25 move upwardly when they are engaged by the sand 22, and simultaneously urge the sand 22 toward the holes 43 substantially in the center of the transportation element 34 (FIG. 3A).

It would be appreciated by those skilled in the art that each removal element 25 is positioned so that it engages only the one-half of the sand on the transportation element 34 in order that relatively less sand may be engaged by each of the removal elements 25, thereby reducing the force exerted on each removal element 25 by the sand (if any) adhering to the transportation element 34. Any sand remaining on the transportation element 34 is, in this way, pushed toward the center holes 43 of the transportation element 34 (FIG. 3A). The sand falls through the center holes 43 to the upper end 30 of the enclosure 26 (FIG. 1D).

Those skilled in the art would appreciate that the sand could, alternatively, be pushed to the sides of the transportation element 34 and off the transportation element.

It has been determined that the arrangement of the sand removal subassemblies 23 described above is advantageous because it appears to mitigate the significant wear to which the removal elements 25 are subjected. In particular, devices that are positioned to block all the sand carried on the transportation element 34 tend to wear out quickly. Because of this, it is preferred that a number of sand removal subassemblies 23 are utilized as described above, spaced apart over a length of the upper trough 62 and arranged on alternating sides of the transportation element 34 (FIGS. 3A, 3B). Because of the need to minimize wear, it is also desirable to have the removal element 25 move in response to its engagement with the sand, also as described above, to mitigate the abrasive impact of the sand on the removal element 25.

As will be described, various arrangements of curbs are possible. In one embodiment, the conveyor system 20 preferably includes one or more curb elements 45, positioned in the preselected region 40, and one or more elongate lower trough elements 49, for at least partially defining the lower trough 60. It is also preferred that the system 20 includes one or more support brackets 51 securable to the curb element 45, for supporting and locating the lower trough element 49 in a predetermined position relative to the curb element 45 for permitting the transportation element 34 to move through the lower trough at least partially defined by the lower trough element 49.

Figure 6B:
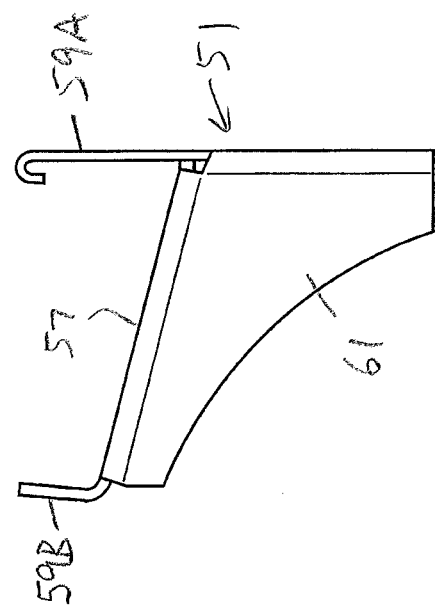
FIG. 6B is a side view of the bracket of FIG. 6A.

As illustrated in FIG. 1C, in one embodiment, the curb element 45 preferably is formed to support the support bracket 51, and to locate the support bracket 51 so that it will position the lower trough element 49 in a predetermined position therefor, to locate the lower trough 60 so that the chain 34 is movable therethrough. Those skilled in the art would appreciate that the curb element 45 may be, for example, poured in situ. The support bracket 51 preferably is secured to the curb element 45 by any suitable fastening means (FIG. 6D). As can also be seen in FIG. 1C, in one embodiment, the system 20 preferably includes the grate(s) 58 that substantially cover the lower trough 60. The grate(s) 58 preferably are held in place above the lower trough 60 by grate brackets 53 (FIG. 7E).

As can be seen in FIG. 1C, in use, some of the sand 22 is moved outwardly from the enclosure 26 (i.e., toward the gutter 31) by the cow "C" (not shown in FIG. 1C), as indicated by arrow "B". A part of the sand so moved falls through the grate 58 and onto the part of the transportation element 34 located in the lower trough 60, as indicated by arrow "N".

Figure 6A:
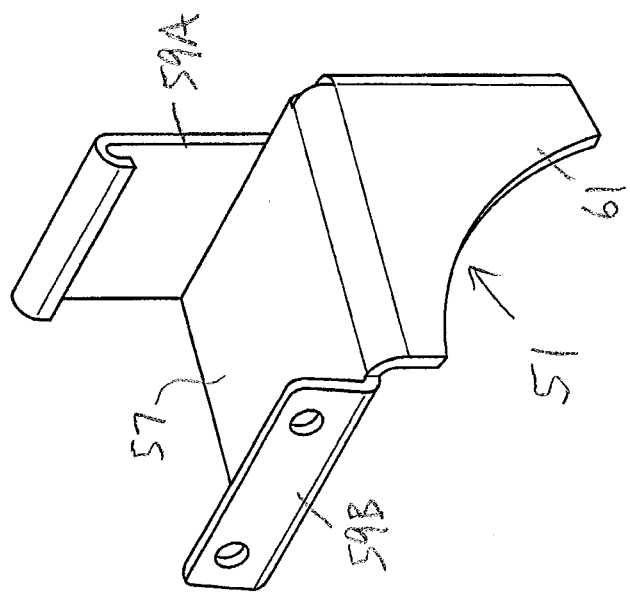
FIG. 6A is an isometric view of an embodiment of a lower trough support bracket of the invention, drawn at a larger scale.

It will be understood that the lower trough element 49 preferably is covered by the grate 58, and extends along the width of the stalls (as shown in FIG. 1A). The lower trough element 49 preferably is supported by the support brackets 51, which are positioned at intervals along the length of the lower trough bracket 49 (FIGS. 6C, 6D). In one embodiment, the support bracket 51 preferably includes a main portion 57, side portions 59A, 59B connected to the main portion 57, and a leg portion 61 (FIGS. 6A, 6B). Preferably, the support bracket 51 is formed so that it supports the lower trough element 49 so that its floor "O" is at an angle γ relative to the horizontal (FIGS. 1C, 7E). As it moves through the lower trough 60, the transportation element 34 is held, by the corner wheel subassemblies at the ends of the lower trough 60, at approximately angle γ relative to the horizontal. It has been found that, due to the elevation difference between the upper and lower ends 30, 24, the corner wheel subassemblies so that the pulleys thereof preferably are positioned at an angle that is approximately parallel to the slope between the upper and lower ends 30, 24. Accordingly, in one embodiment, the guide subassembly 42 preferably positions the part of the transportation element 34 that is in the lower trough 60 at a predetermined angle γ relative to the horizontal (FIG. 7E).

It will be understood that the angle γ may be any suitable angle, and that the angle γ is determined in accordance with a wide variety of factors. For example, as illustrated, the angle γ is approximately 11°. However, for any particular installation of the system, the operator may prefer that the position of the transportation element 34 relative to the horizontal be more or less than 11°, depending on the operator's preferences, and the configurations of the stalls, and ultimately on what appears to be appropriate cow positioning in the circumstances.

As can be seen in FIG. 11, in one embodiment, the system preferably also includes one or more blocking plates 63 for covering one or more selected portions of the lower trough 60, to prevent foreign matter from falling into the lower trough at the preselected location. As noted above, urine and fecal matter (i.e., the "foreign matter") from the cows, besides ruining the sand directly affected thereby, can also accumulate, e.g., in the lower trough, and when mixed with sand, form a relatively dense material that ultimately may impede movement of the transportation element 34 along the predetermined path 38, 138. The blocking plate 63 is formed and positioned to prevent fecal matter from falling into the lower trough 60. It has been determined that, when the cow is lying down in the stall, the cow tends to position her body along a side of the stall. For example, in FIG. 11, a left stall divider for a stall 28' is identified for convenience as "V₁", and a right stall divider is identified as "V₂" (FIG. 11). Accordingly, the blocking plate 63 preferably is positioned above the lower trough 60 at locations that are substantially aligned with the stall dividers. In this way, the bulk of the fecal matter is blocked, with minimal impact on the amount of sand moved into the lower trough 60.

Those skilled in the art would appreciate that the curb element illustrated in FIG. 1C may, alternatively, be a precast 7" curb element. The precast curb element, referred to by reference numeral 45' for clarity of illustration, is illustrated in FIGS. 7D and 7F. It will be understood that the 7" precast curb element 45' preferably is strengthened by rebar 65 positioned in the precast curb element 45', when the precast curb element 45' is formed, as is known. Those skilled in the art would also appreciate that the 7" precast curb 45' preferably is pinned to the floor, to securely position it on the floor adjacent to the gutter. Preferably, the curb 45' includes mounting ports 95, to facilitate pinning the curb 45' to the floor. As can be seen in FIG. 7F, once the precast curb element 45' is secured in position, the support bracket 51 preferably is secured to the 7" precast curb 45'. As will be described, the support bracket 51 (FIG. 7E) is for locating the trough element 49 in a predetermined position relative to the curb.

Those skilled in the art would appreciate that, in some situations, it is desirable to utilize a pre-existing curb element. It will be understood that FIG. 1C also illustrates this situation, i.e., the curb illustrated in FIG. 1C may be a pre-existing curb.

In an alternative embodiment, the system preferably includes the support bracket(s) 51 securable to one or more pre-existing curbs and the elongate lower trough element 49, for at least partially defining the lower trough 60. The support bracket 51 preferably is configured to support and locate the lower trough element 49 in a predetermined position relative to the pre-existing curb element for permitting the transportation element 34 to move through the lower trough 60 at least partially defined by the lower trough element 49.

Figure 7A:
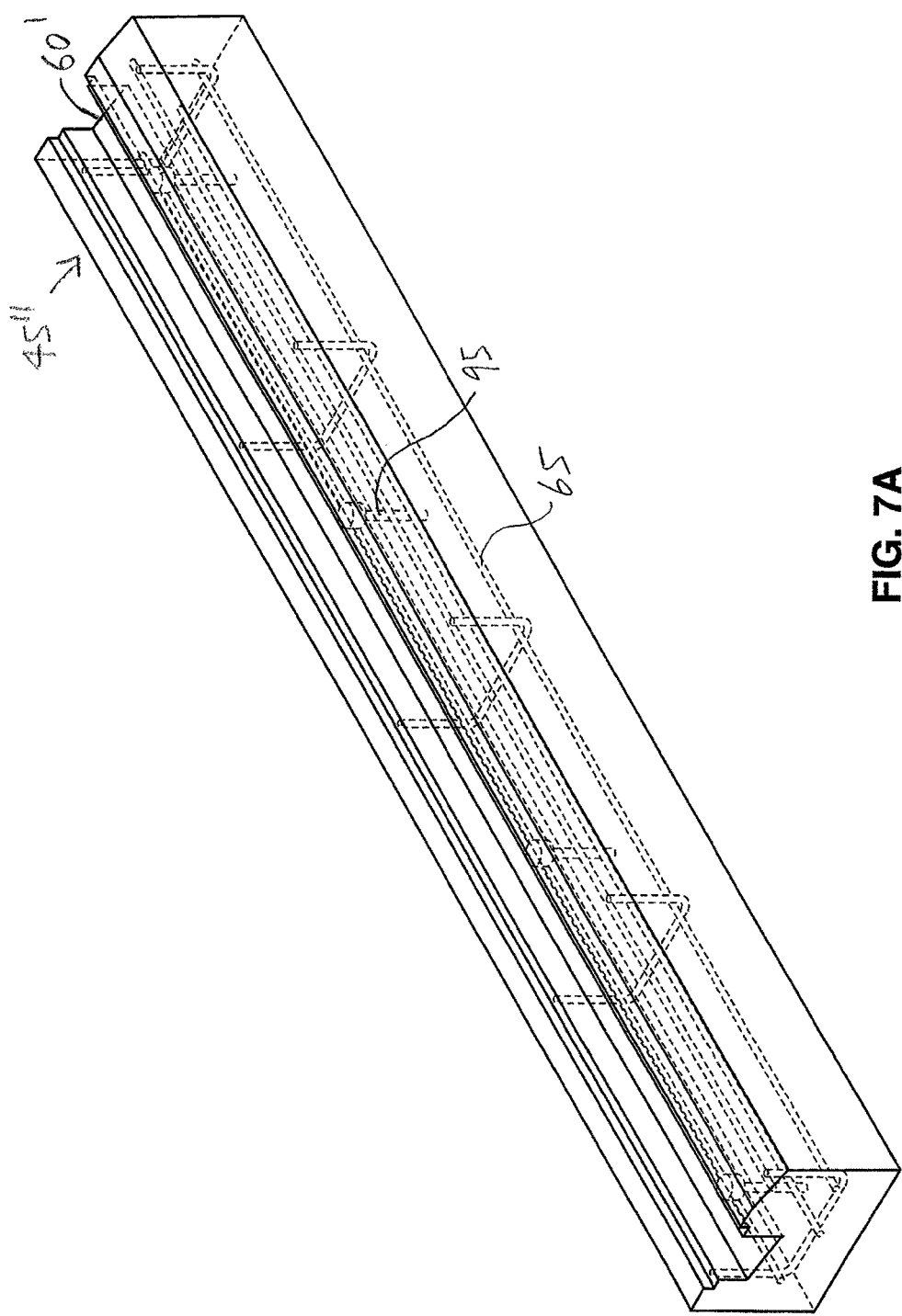
FIG. 7A is an isometric view of an embodiment of a precast curb element of the invention including a lower trough.
Figure 7B:
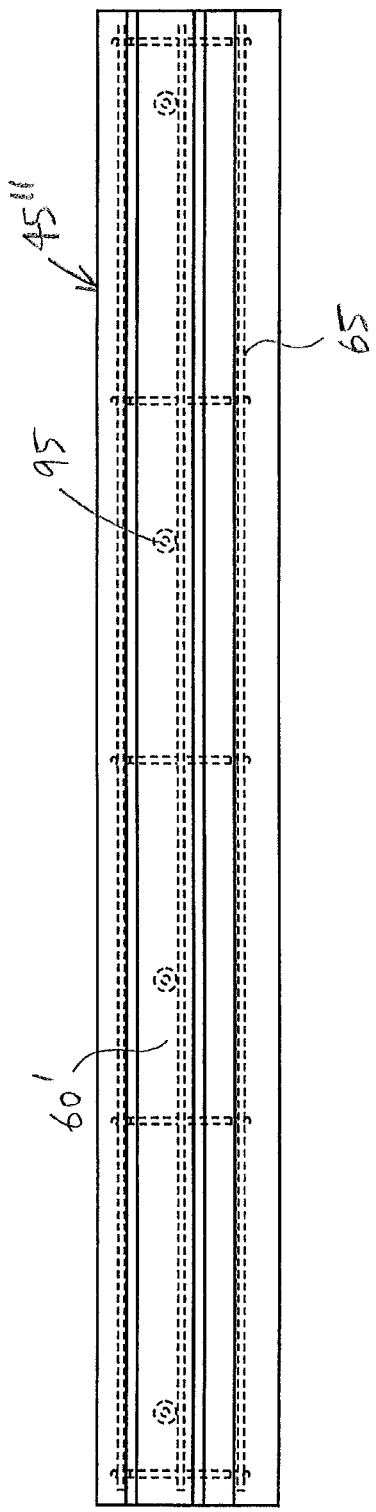
FIG. 7B is a top view of the precast curb element of FIG. 7A.
Figure 7C:
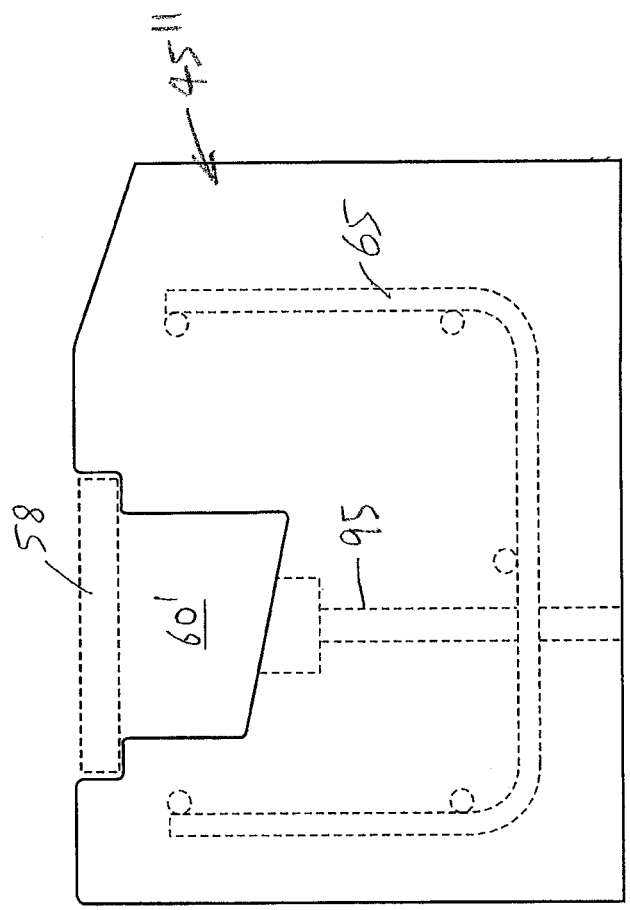
FIG. 7C is an end view of the precast curb element of FIGS. 7A and 7B.
Figure 7D:
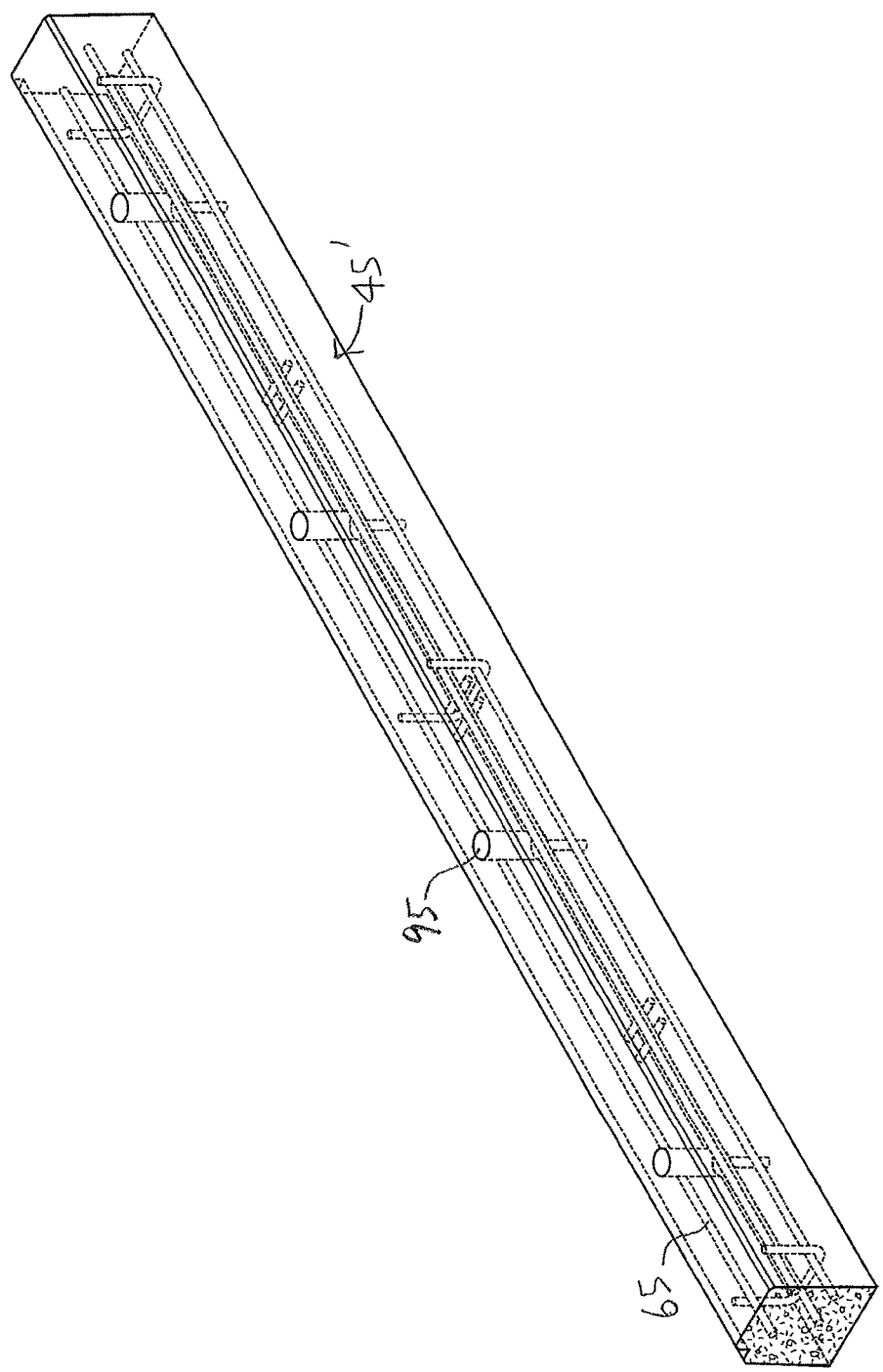
FIG. 7D is an isometric view of an alternative embodiment of a precast curb element of the invention, drawn at a smaller scale.
Figure 7E:
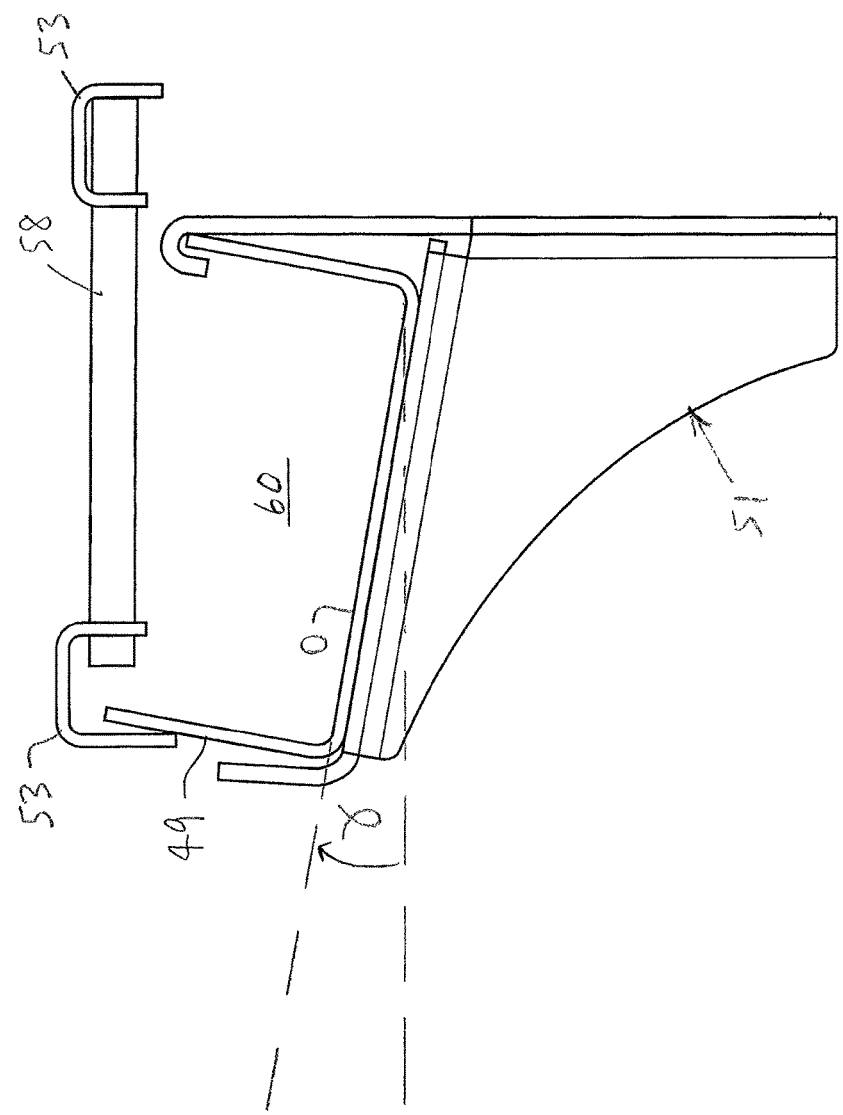
FIG. 7E is a side view of an embodiment of a support bracket of the invention supporting an embodiment of a lower trough element of the invention, drawn at a larger scale.
Figure 7F:
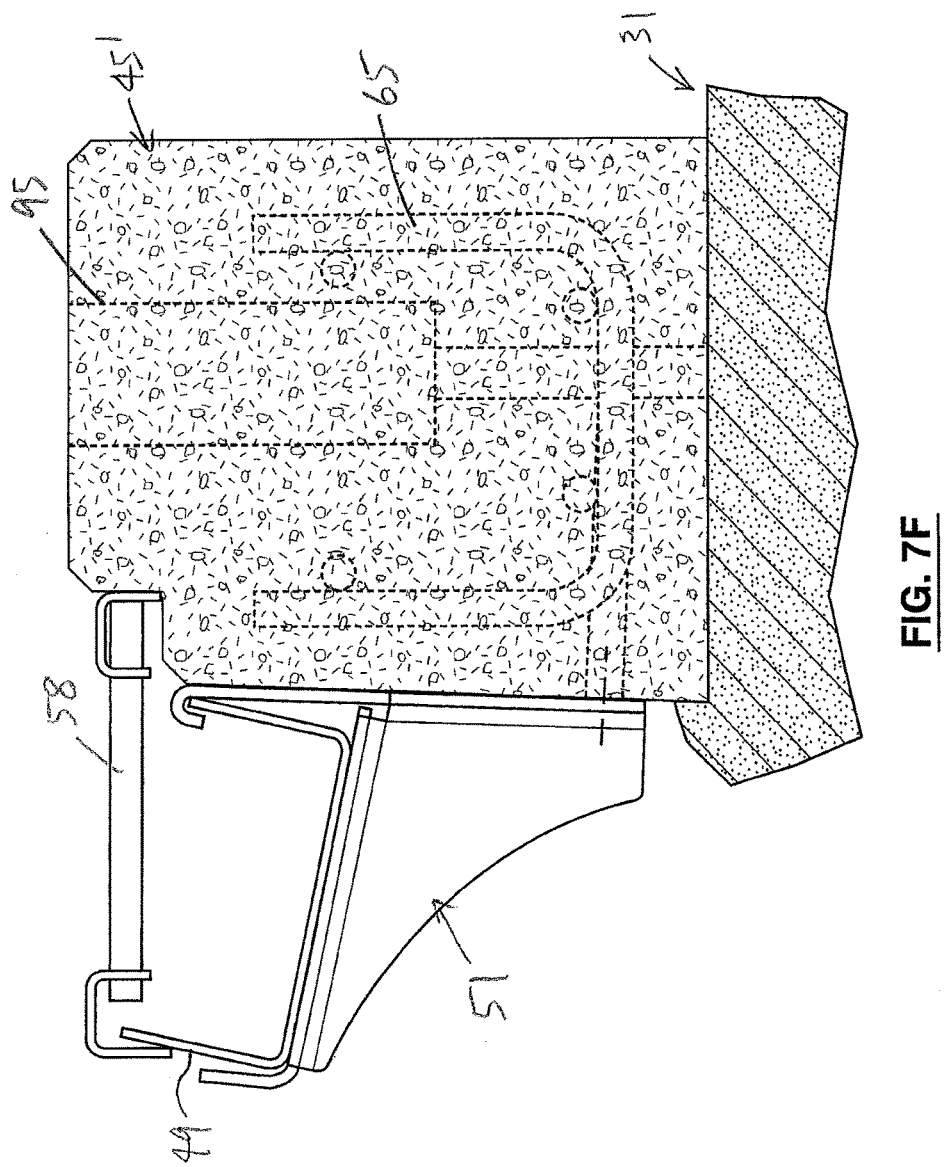
FIG. 7F is an end view of the precast curb element of FIG. 7D with the support bracket of FIG. 7E secured thereto, and the lower trough element supported by the support bracket, drawn at a smaller scale.

An alternative precast curb 45" is illustrated in FIGS. 7A-7C. In this embodiment of the curb, the lower trough 60' is partially defined by the curb. Preferably, the system includes one or more curb elements 45" for at least partially defining the lower trough 60' in which a part of the transportation element 34 is receivable. The lower trough 60' defines a lower part of the predetermined path 38. The precast curb 45" preferably is pinned into position in the preselected region 40 so that the lower trough 60' is aligned with the lower part of the predetermined path 38, 138, i.e., so that the transportation element 34 is movable through the lower trough 60'. Preferably, the curb 45" includes mounting ports 95, to facilitate pinning the curb 45" to the floor. At least a portion of the sand moved outwardly from the lower end of the enclosure region is receivable on the part of the transportation element positioned in the lower trough 60'. Preferably, the system also includes the grate 58 (FIG. 7C) located at least partially above the part of the transportation element 34 positioned in the lower trough 60'. The grate 58 is formed to permit the portion of the sand moved outwardly from the lower end of the enclosure region to pass therethrough onto the part of the transportation element positioned in the lower trough 60'. The precast curb 45" preferably also is strengthened by rebar 65 inside it, as is known.

As noted above, the guide subassembly 42 preferably includes corner wheel subassemblies 78. An embodiment of the corner wheel subassembly 78 of the invention is illustrated in FIG. 4A. It will be understood that the pulley 73 may rotate in a clockwise direction, or otherwise. To simplify the description, however, it is assumed that the direction of travel of the transportation element 34 in FIGS. 4A and 4B is as indicated by arrow "A".

As indicated in FIG. 4A, it is preferred that the corner wheel subassembly 78 includes a floor 85 that at least partially supports the transportation element 34 as it engages the pulley 73 to guide the transportation element 34 around a corner part "Q" of the predetermined path 38. Preferably, the pulley 73 has a slot 75 in which the transportation element 34 is at least partially engaged as the transportation element 34 moves around the corner. The corner bracket 67 holds the pulley 73 in position. It is believed that the floor 85 stabilizes the transportation element 34 somewhat as it engages the pulley 73, so that twisting or transverse tilting of the transportation element 34 as it engages the pulley 73 is minimized.

Figure 4B:
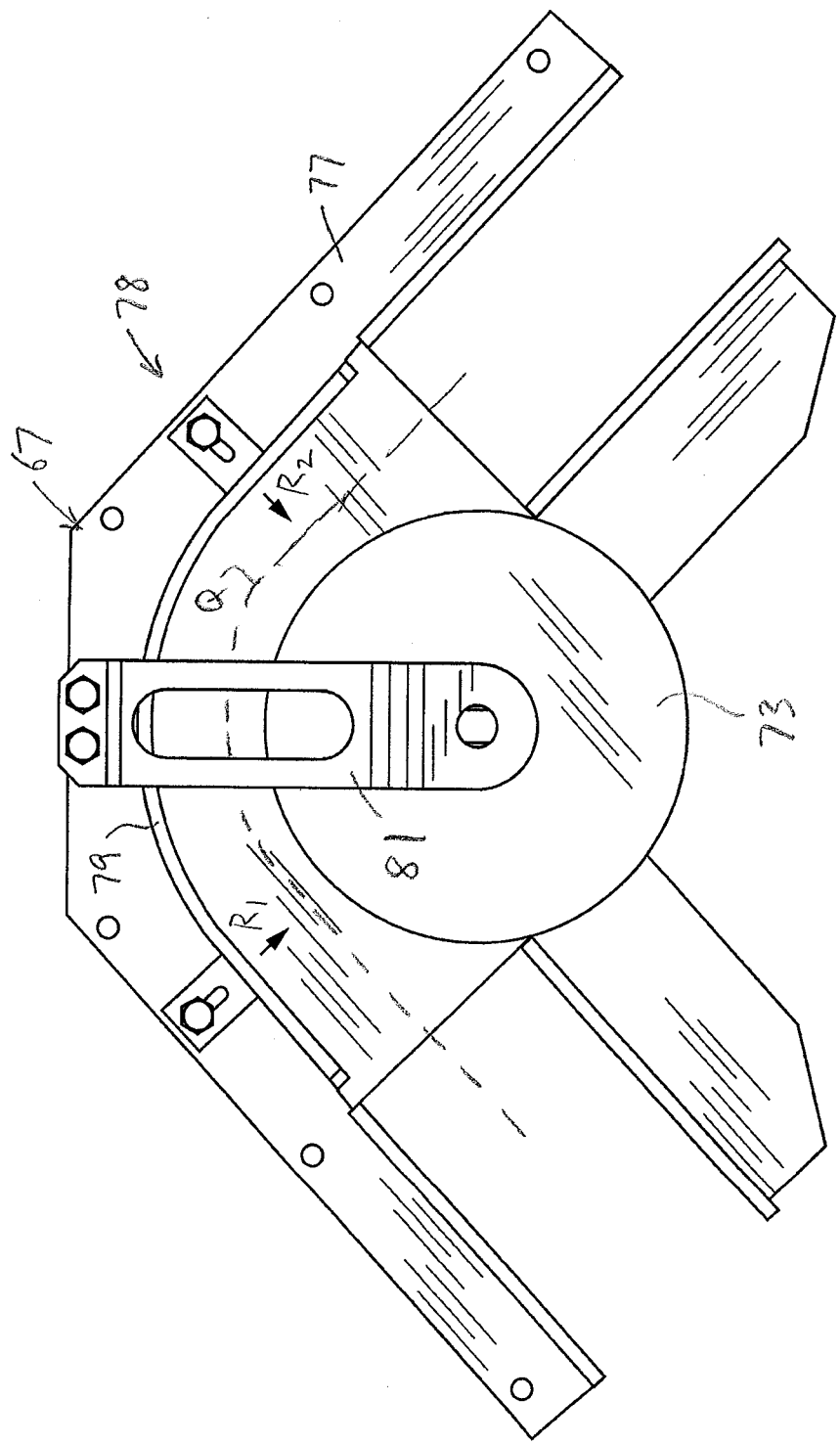
FIG. 4B is a top view of the corner bracket assembly of FIG. 4A.

As can be seen in FIG. 4B, in one embodiment, the corner bracket 67 also includes a base 77 having an outer wall 79. The corner wheel subassembly 78 preferably also includes a pulley bracket 81 for rotatably mounting the pulley 73 on the base 77. The pulley 73 and the outer wall 79 at least partially define the corner part "Q" of the predetermined path 38 therebetween. The outer wall 79 is repositionable relative to the base 77 to guide the transportation element 34 substantially along the corner part "Q" of the predetermined path 38.

Those skilled in the art would appreciate that the location of the outer wall 79 preferably is such that the transportation element 34 is guided thereby with minimal friction. In practice, the outer wall 79 preferably is located so that the transportation element 34 is gently guided around the corner part of the predetermined path 38 by the outer wall 79. However, due to friction, the position of the transportation element as it moves through the corner part gradually shifts inwardly, i.e., due to the transportation element 34 wearing the pulley (in the slot thereof) down. Accordingly, in order to position the transportation element 34 properly over time, the outer wall 79 preferably is adjustable. It can be moved inwardly (i.e., as indicated by arrows "$R_1$", "$R_2$" in FIG. 4B) or outwardly as required by loosening and tightening the fasteners that secure the outer wall 79 to the base 77.

Figure 8A:
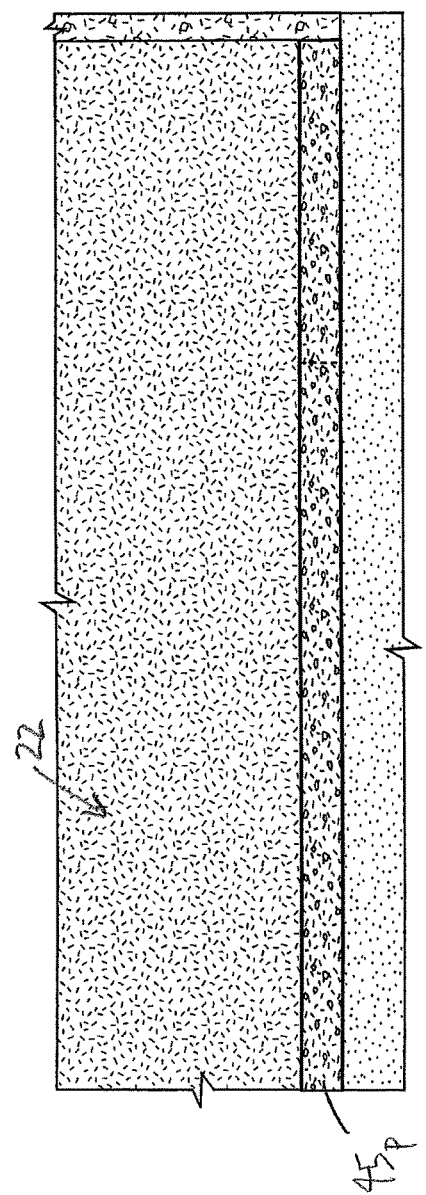
FIG. 8A is a top view of a pre-existing curb at a stall, drawn at a smaller scale.
Figure 8B:
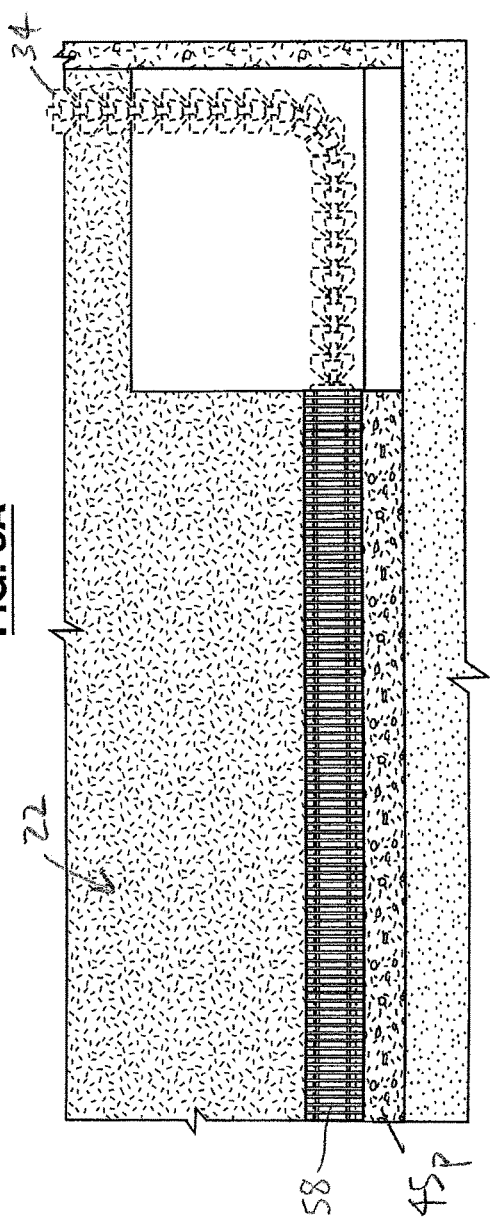
FIG. 8B is a top view of the pre-existing curb of FIG. 8A with a selected portion thereof removed.
Figure 8C:
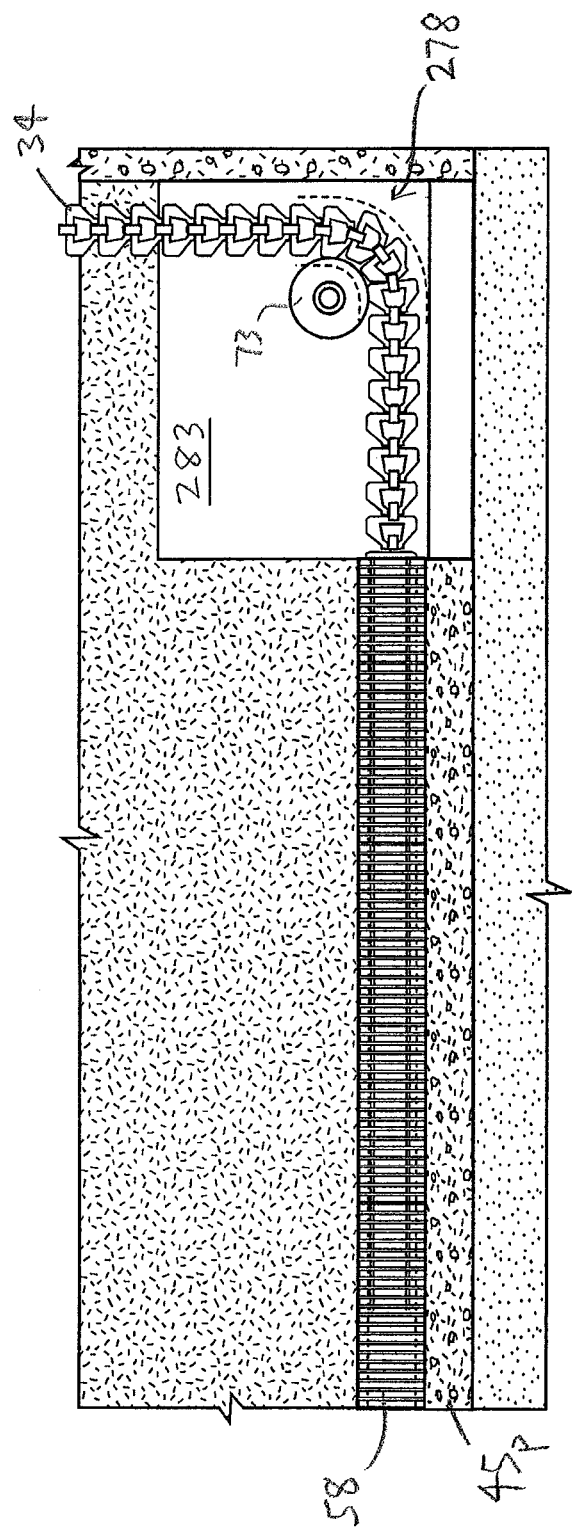
FIG. 8C is a top view of the pre-existing curb of FIG. 8B and parts of an embodiment of the corner wheel subassembly of the invention.

Another alternative arrangement is illustrated in FIGS. 8A-8C. In FIG. 8A, a top view of a pre-existing curb $45_p$ is shown, prior to any modification thereof. In FIG. 8B, the pre-existing curb $45_p$ is shown with a portion thereof removed, to permit a corner wheel subassembly 278 (FIG. 8C) to be installed. Those skilled in the art would appreciate that removal of the portion of the pre-existing curb $45_p$ is needed in order that the corner wheel subassembly 278 may be positioned as required in relation to the lower trough. The intended position of the transportation element 34 that is to be engaged with the corner wheel subassembly 278 after its installation is also illustrated in FIG. 8B, in dashed lines.

It is preferred that the corner wheel subassembly 278 includes a plate 283 that is positioned at least partly in the enclosure area. Preferably, the plate 283 is made of steel or any other suitable material, and is secured to a floor 285 by any suitable fasteners (not shown). For clarity of illustration, only the pulley 73 is shown in FIG. 8C, it being understood that all other elements of the corner wheel subassembly 278 except for the plate 283 are omitted. As can be seen in FIG. 5C, the plate 283 provides a base to which a corner bracket (not shown) is securable. As a practical matter, the plate 283 is useable in many situations where the system of the invention is installed in a barn with a pre-existing curb, and the curb is to be utilized in part.

The system 20 preferably includes a variety of relays and other contacts that, upon the supply of electrical power being interrupted, trip, and thereby open the circuits in which they are included. Once open, the circuits are not closed until reset. In one embodiment (not shown), the system 20 preferably includes a battery back-up subassembly (not shown) electrically connectable to the motor 66 upon an interruption in the supply of electric power to the system 20.

Because of the relays and other contacts opening upon only a brief interruption in the power supply, in the absence of the battery power supply, the system 20 would be inoperable upon such interruption occurring. Furthermore, the system 20 would remain inoperable until the relays and other contacts were reset by the operator. Accordingly, the battery subassembly is designed to supply electric power to the system upon a power interruption taking place, to prevent the relays and other contacts opening. Once the usual power supply is activated, the battery subassembly ceases providing electric power.

Those skilled in the art would appreciate that the system of the invention may be used with any stalls with sand in them, regardless of the animals in the stalls.

Those skilled in the art would appreciate that the system 20 has a number of advantageous features. For instance, unlike conventional systems for processing the sand that is moved from the stalls by the cows, the system of the invention permits conventional barn scrapers to be used to remove manure, i.e., by scraping the gutter. This is possible because, where the system is installed, the manure in the gutter is virtually sand-free. The conventional scraper provides the simplest and least expensive way to move the manure from the gutter. Also, because the manure is substantially sand-free, the manure can be processed and otherwise dealt with using conventional equipment that will not be subjected to significant abrasive wear.

INDUSTRIAL APPLICABILITY

In use, the transportation element 34 is moved in the predetermined direction of travel (indicated by arrows "A" and "A₁" in FIGS. 1A and 11 respectively) by the drive subassembly 36. When part of the sand 22 is moved outwardly from the lower end 24 of the enclosure 26 by the cows (as indicated by arrow "B" in FIGS. 1A and 11), at least a portion of the sand that is so moved falls through the grate 58 and into the lower trough 60, where it falls upon the part of the transportation element 34 that is moving through the lower trough 60. The sand 22 that is on the transportation element 34 is then moved by the transportation element to the upper trough 62. As the transportation element moves through the upper trough 62, the sand falls from the transportation element 34 onto the upper end 30 of the enclosure region 26.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A conveyor system for transporting sand moved from a lower end of an enclosure region in at least one animal stall to an upper end of the enclosure region, said at least one stall being positioned adjacent to a gutter, the conveyor system comprising:
    a conveyor assembly comprising:
        a transportation element for moving the sand;
        a drive subassembly for moving the transportation element in a predetermined direction of travel on a predetermined path between a preselected region that is located between the lower end and the gutter, and the upper end of the enclosure region;
        at least one guide subassembly, for guiding the transportation element along the predetermined path when the transportation element is moved by the drive subassembly;
    the drive subassembly comprising:
        a sprocket for engaging the transportation element, to move the transportation element on the predetermined path;
        a motor for rotating the sprocket, to move the transportation element, the motor comprising a motor switch for controlling energization of the motor;
        a first idler wheel for guiding the transportation element to the sprocket;
        a second idler wheel for guiding the transportation element away from the sprocket;
        a floating idler wheel positioned on the predetermined path between the sprocket and the second idler wheel, the floating idler wheel being rotatable about an axle, the axle having ends thereof received in substantially vertical slots extending between top and bottom ends thereof to permit vertical movement of the floating idler wheel between an upper location, in which the floating idler wheel is positioned substantially at the top ends of the slots, and a lower location, in which the floating idler wheel is positioned substantially at the bottom ends of the slots in response to variations in tension to which the transportation element is subjected; and
        a limit switch positioned to be activated upon the floating idler wheel moving to the lower location, the limit switch being configured to transmit a signal to the motor switch to de-energize the motor upon activation of the limit switch.

2. A conveyor system according to claim 1 in which the drive subassembly additionally comprises an alarm device for providing an alarm signal when the motor is de-energized upon activation of the limit switch.

3. A conveyor system according to claim 1 in which the drive subassembly additionally comprises an exit idler wheel positioned for engagement with the transportation element after the second idler wheel, for guiding the transportation element on the predetermined path.

4. A conveyor system according to claim 3 in which the sprocket and the first and second idler wheels are respectively rotatable about axes thereof positioned for substantial alignment of the first and second idler wheels in a first direction, and the exit idler wheel is rotatable about an exit idler axis positioned for substantial alignment of the exit idler wheel in a second direction that is substantially orthogonal to the first direction.

5. A conveyor system according to claim 3 in which the drive subassembly additionally comprises a guide bearing element positioned to guide the transportation element from the second idler wheel to the exit idler wheel.

6. A conveyor system according to claim 3 in which the first idler wheel and the exit idler wheel each comprise flanges for substantially aligning the transportation element with the first and second directions respectively upon engagement of the transportation element with each of the first idler wheel and the exit idler wheel respectively.

7. A conveyor system according to claim 1 in which:
    the motor comprises a rotatable output shaft thereof, through which the motor is connectable with the sprocket;
    the drive subassembly additionally comprises a slip clutch subassembly for releasably connecting the sprocket with the rotatable output drive shaft of the motor; and
    the clutch subassembly being configured to rotate the sprocket at the same speed as the output drive shaft when movement of the transportation element by the sprocket is unimpeded, and to permit the output drive shaft and the sprocket to rotate at different speeds respectively, when movement of the transportation element movement is impeded.

8. A conveyor system according to claim 7 in which:
    the sprocket comprises a plurality of first detents;
    the slip clutch subassembly comprises:
        a clutch plate mounted to the output drive shaft, the clutch plate comprising second detents alignable with the first detents respectively;
        a plurality of intermediate elements partially receivable respectively in the first and second detents, when the respective first and second detents are aligned; and
        the intermediate elements permitting the clutch plate and the sprocket clutch plate to rotate at different speeds respectively when movement of the transportation element is impeded such that the sprocket rotates at a sprocket rotation speed that is less than a clutch plate rotation speed of the clutch plate.

9. A conveyor system according to claim 8 additionally comprising:
a motion detector configured for transmitting a stop signal to the motor switch to de-energize the motor upon the motion detector detecting that the transportation element is stationary relative to the motion detector over a preselected time period.

10. A conveyor system according to claim 9 in which the drive subassembly additionally comprises an alarm device for providing a signal when the motor is de-energized upon the motion detector transmitting the stop signal to the motor switch.

11. A conveyor system according to claim 1 in which the sprocket comprises:
a sprocket body rotatable about a sprocket axis; and
a plurality of teeth elements releasably securable to the sprocket body, for engagement with the transportation element.

12. A conveyor system according to claim 1 additionally comprising at least one sand removal subassembly comprising:
a removal element for moving the sand off the transportation element as the transportation element carrying the sand thereon moves relative to the removal element; and
a mounting bracket in which the removal element is mounted, for permitting substantially vertical movement of the removal element relative to the transportation element, in response to engagement thereof by the sand on the transportation element.

13. A conveyor system according to claim 1 additionally comprising an upper trough positioned at the upper end of the enclosure region through which the transportation element is movable, the trough defining an upper part of the predetermined path, the upper trough comprising a top portion and at least one side portion connected to the top portion and at least partially defining at least one opening in the upper trough through which the sand is permitted to fall from the transportation element to the upper end of the enclosure region.

14. A conveyor system according to claim 13 additionally comprising a wear bar positioned to at least partially support the upper trough, the wear bar being formed to resist wear thereof.

15. A conveyor system according to claim 1 additionally comprising:
at least one curb element, positioned in the preselected region;
at least one elongate lower trough element, for at least partially defining the lower trough; and
at least one support bracket securable to said at least one curb element, for supporting and locating said at least one lower trough element in a predetermined position relative to said at least one curb element for permitting the transportation element to move through the lower trough at least partially defined by said at least one lower trough element.

16. A conveyor system according to claim 15 in which said at least one guide subassembly positions the part of the transportation element that is in the lower trough at a predetermined angle relative to the horizontal.

17. A conveyor system according to claim 15 additionally comprising at least one blocking plate for covering at least one selected portion of the lower trough to prevent foreign matter from falling into the lower trough at the preselected location.

18. A conveyor system according to claim 1 additionally comprising:
at least one support bracket securable to at least one pre-existing curb;
at least one elongate lower trough element, for at least partially defining the lower trough; and
said at least one support bracket being configured to support and locate said at least one lower trough element in a predetermined position relative to said at least one pre-existing curb element for permitting the transportation element to move through the lower trough at least partially defined by said at least one lower trough element.

19. A conveyor system according to claim 1 comprising:
at least one curb element for at least partially defining a lower trough in the preselected region in which a part of the transportation element is receivable, the lower trough defining a lower part of the predetermined path,
at least a portion of the sand moved outwardly from the lower end of the enclosure region being receivable on the part of the transportation element positioned in the lower trough;
at least one grate located at least partially above the part of the transportation element positioned in the lower trough; and
said at least one grate being adapted to permit the portion of the sand moved outwardly from the lower end of the enclosure region to pass through said at least one grate onto the part of the transportation element positioned in the lower trough.

20. A conveyor system according to claim 1 in which said at least one guide subassembly comprises:
a corner bracket comprising:
a pulley comprising a slot therein in which a portion of the transportation element is receivable as the portion engages the pulley, to guide the transportation element around a corner part of the predetermined path;
a base comprising an outer wall;
a pulley bracket for rotatably mounting the pulley on the base;
the pulley and the outer wall defining the corner part of the predetermined path therebetween, and the outer wall being repositionable relative to the base to guide the transportation element substantially along the corner part of the predetermined path.

* * * * *